United States Patent
Uhlig et al.

(12)

(10) Patent No.: US 11,958,500 B1
(45) Date of Patent: Apr. 16, 2024

(54) AUTONOMOUS VEHICLE MODEL TRAINING AND VALIDATION USING LOW-DISCREPANCY SEQUENCES

(71) Applicant: GHOST AUTONOMY INC., Mountain View, CA (US)

(72) Inventors: Volkmar Uhlig, Cupertino, CA (US); Par Botes, Atherton, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

(21) Appl. No.: 18/189,781

(22) Filed: Mar. 24, 2023

Related U.S. Application Data

(63) Continuation-in-part of application No. 17/740,888, filed on May 10, 2022.

(51) Int. Cl.
*B60W 60/00* (2020.01)
*B60W 40/02* (2006.01)
*G06N 3/08* (2023.01)

(52) U.S. Cl.
CPC .......... *B60W 60/001* (2020.02); *B60W 40/02* (2013.01); *G06N 3/08* (2013.01); *B60W 2554/4041* (2020.02); *B60W 2554/4046* (2020.02)

(58) Field of Classification Search
CPC ............... B60W 60/001; B60W 40/02; B60W 2554/4041; B60W 2554/4046; G06N 3/08
See application file for complete search history.

(56) References Cited

U.S. PATENT DOCUMENTS

| | | |
|---|---|---|
| 11,010,691 B1 | 5/2021 | Chen et al. |
| 11,501,042 B2 | 11/2022 | Steingrimsson et al. |
| 11,754,998 B2* | 9/2023 | Zhao ............... G05B 11/36 700/29 |
| 2015/0338550 A1 | 11/2015 | Wadsley |
| 2021/0018590 A1* | 1/2021 | Grau ............... B60W 60/00186 |
| 2021/0117696 A1* | 4/2021 | Hertlein ............... G06V 20/653 |
| 2022/0230072 A1 | 7/2022 | Gladisch et al. |
| 2022/0246241 A1 | 8/2022 | Acedo et al. |

(Continued)

OTHER PUBLICATIONS

Cheng et al., "Computational Investigation of Low-Discrepancy Sequences in Simulation Algorithms for Bayesian Network", Uncertainty in Artificial Intelligence Proceedings, 2000, pp. 72-81.

*Primary Examiner* — Steven W Crabb

(57) ABSTRACT

Autonomous vehicle model training and validation using low-discrepancy sequences may include: generating a low-discrepancy sequence in a multidimensional space comprising a plurality of multidimensional points; mapping each sample of a plurality of samples of a data corpus to a corresponding entry in the low-discrepancy sequence, wherein each sample of the plurality of samples comprises one or more environmental descriptors for an environment relative to a vehicle and one or more state descriptors describing a state of the vehicle; selecting, from the data corpus, a training data set by selecting, for each multidimensional point of the low-discrepancy sequence having one or more mapped samples, a mapped sample for inclusion in the training data set; and training one or more models used to generate autonomous driving decisions of an autonomous vehicle based on the selected training data set.

22 Claims, 11 Drawing Sheets

(56) References Cited

U.S. PATENT DOCUMENTS

| | | | |
|---|---|---|---|
| 2022/0284294 A1* | 9/2022 | Keller | G06F 18/214 |
| 2022/0391766 A1 | 12/2022 | Marrero et al. | |
| 2023/0092969 A1* | 3/2023 | Chang | G06F 18/2137 |
| | | | 706/15 |
| 2023/0105871 A1* | 4/2023 | Nichols | G01C 21/3804 |
| | | | 701/25 |

* cited by examiner

AUTONOMOUS VEHICLE MODEL TRAINING AND VALIDATION USING LOW-DISCREPANCY SEQUENCES

CROSS REFERENCE TO RELATED APPLICATION

This is a continuation in-part application for patent entitled to a filing date and claiming the benefit of earlier-filed U.S. patent application Ser. No. 17/740,888, filed May 10, 2022, herein incorporated by reference in its entirety.

BACKGROUND

Field of the Invention

The field of the invention is autonomous vehicle systems, or, more specifically, methods, apparatus, and products for training and validating autonomous driving models.

SUMMARY

A data corpus may be mapped to a low-discrepancy sequence in a multidimensional space. The mapping may be used to select an event distribution of training data from the data corpus. Low-discrepancy sequences may also be used to generate evenly distributed sets of synthetic data usable in validating autonomous driving models.

Autonomous vehicle model training and validation using low-discrepancy sequences may include: generating a low-discrepancy sequence in a multidimensional space comprising a plurality of multidimensional points; mapping each sample of a plurality of samples of a data corpus to a corresponding entry in the low-discrepancy sequence, wherein each sample of the plurality of samples comprises one or more environmental descriptors for an environment relative to a vehicle and one or more state descriptors describing a state of the vehicle; selecting, from the data corpus, a training data set by selecting, for each multidimensional point of the low-discrepancy sequence having one or more mapped samples, a mapped sample for inclusion in the training data set; and training one or more models used to generate autonomous driving decisions of an autonomous vehicle based on the selected training data set.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
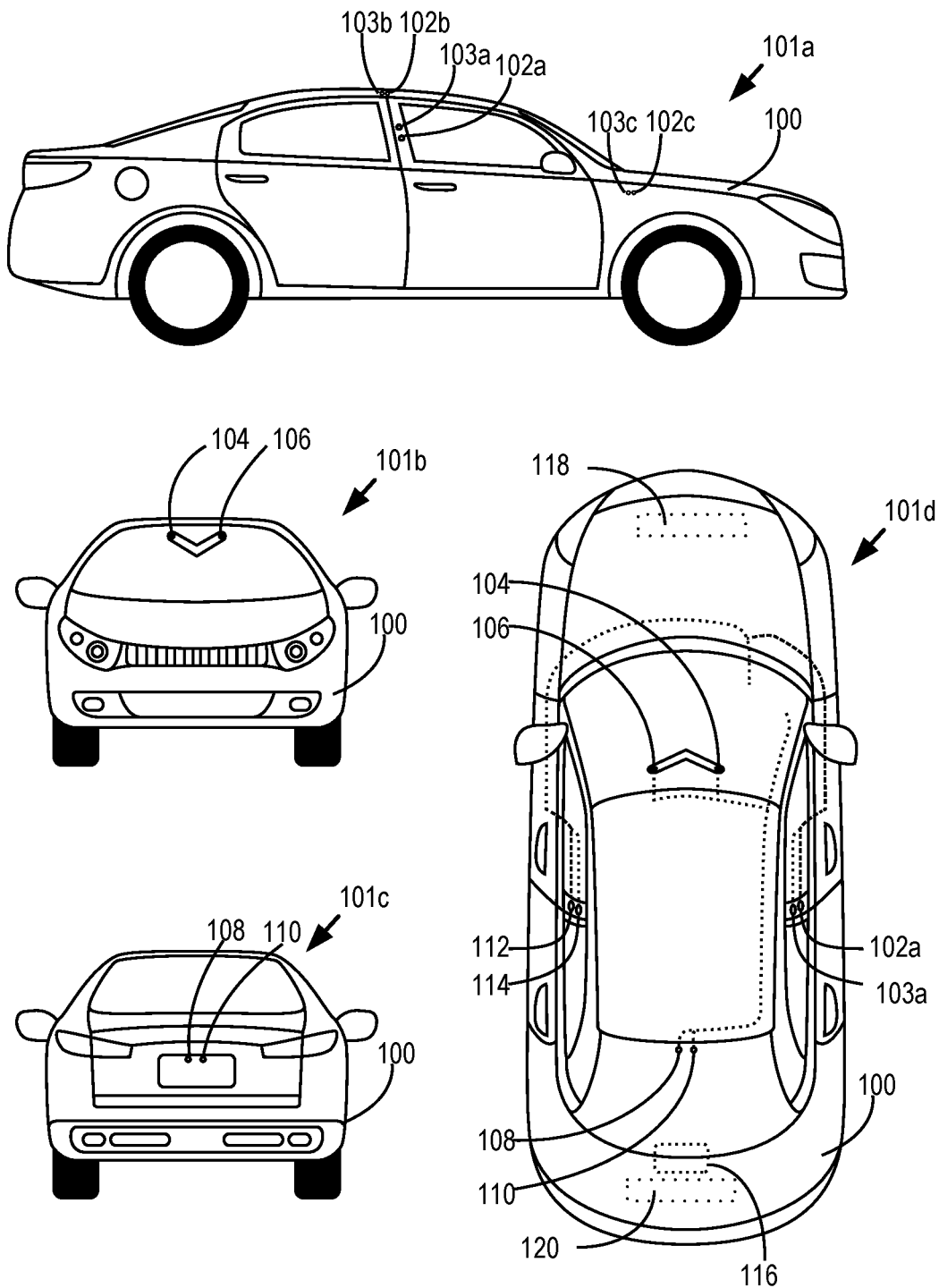
FIG. 1 shows example views of an autonomous vehicle for autonomous vehicle model training using low-discrepancy sequences according to some embodiments of the present disclosure.

Autonomous vehicle model training using low-discrepancy sequences may be implemented in an autonomous vehicle. Accordingly, FIG. 1 shows multiple views of an autonomous vehicle 100 configured for autonomous vehicle model training using low-discrepancy sequences according to embodiments of the present disclosure. Right side view 101*a* shows a right side of the autonomous vehicle 100. Shown in the right-side view 101*a* are right-facing cameras 102*a* and 103*a*, configured to capture image data, video data, and/or audio data of the environment external to the autonomous vehicle 100 from the perspective of the right side of the car. Cameras 102*a* and 103*a* are depicted in an exemplary placement location on the autonomous vehicle. In some embodiments, cameras may also be placed in additional or different locations on the autonomous vehicle 100. For example, in some embodiments, cameras 102*b* and 103*b* or cameras 102*c* and 103*c* may be used instead of or in addition to cameras 102*a* and 103*a*.

Front view 101*b* shows a front side of the autonomous vehicle 100. Shown in the front view 101*b* are cameras 104 and 106, configured to capture image data, video data, and/or audio data of the environment external to the autonomous vehicle 100 from the perspective of the front of the car. Rear view 101*c* shows a rear side of the autonomous vehicle 100. Shown in the rear view 101*c* are cameras 108 and 110, configured to capture image data, video data, and/or audio data of the environment external to the autonomous vehicle 100 from the perspective of the rear of the car. Top view 101*d* shows a rear side of the autonomous vehicle 100. Shown in the top view 101*d* are cameras 102*a*-110. Although the top view 101*d* shows cameras 102*a* and 103*a* as right-facing cameras for the autonomous vehicle 100, in some embodiments, other placement locations for right-facing cameras may also be used, such as those of cameras 102*b* and 103*b* or cameras 102*b* and 103*b* as described above. Also shown are left-facing cameras 112 and 114, configured to capture image data, video data, and/or audio data of the environment external to the autonomous vehicle 100 from the perspective of the left side of the car. In some embodiments, other placement locations for left-facing cameras may also be used, such as those similar to cameras 102*b* and 103*b* or cameras 102*b* and 103*b* at corresponding locations on the left side of the car.

As shown, the autonomous vehicle 100 may include pairs of cameras each facing the same direction relative to the autonomous vehicle 100 (e.g., a pair of forward-facing cameras 104 and 106, a pair of rear-facing cameras 108 and 110, a pair of right-facing cameras 102*a* and 103*a*, a pair of left-facing cameras 112 and 114). In some embodiments, each of these cameras may be installed or deployed in a stereoscopic configuration such that each pair of cameras may be used for stereoscopic vision using image data from each camera in the camera pair. In other words, each camera in a given pair may face the same direction and have a substantially overlapping field of view such that their respective image data may be used for stereoscopic vision as will be described below.

Further shown in the top view 101*d* is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102*a*-114 and potentially other sensors), operational data (e.g., a speed, acceleration, gear, orientation, turning direction), and other data to determine an operational state and/or operational history of the autonomous vehicle. The automation computing system 116 may then determine one or more control operations or driving decisions for the autonomous vehicle 100 (e.g., a change in speed or acceleration, a change in brake application, a change in gear, a change in turning or orientation). The automation computing system 116 may also store captured sensor data for later use, transmission, and the like. Operational data of the autonomous vehicle may also be stored in association with corresponding sensor data, thereby indicating the operational data of the autonomous vehicle 100 at the time the sensor data was captured.

Also shown in the top view 101*d* is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several advantages over camera sensors in detecting the environment relative to the autonomous vehicle 100. For example, the radar sensor 118 provides for greater accuracy at longer distances. The radar sensor 118 may also provide for more accurate estimations of velocity or movement of objects. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle 100, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 of FIG. 1 is shown as car, it is understood that autonomous vehicles 100 configured for autonomous vehicle model training using low-discrepancy sequences may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Autonomous vehicle model training using low-discrepancy sequences in accordance with the present disclosure is generally implemented with computers, that is, with automated computing machinery. For further explanation, therefore, FIG. 2 sets forth a block diagram of automated computing machinery comprising an exemplary automation computing system 116 configured for autonomous vehicle model training using low-discrepancy sequences according to specific embodiments. The automation computing system 116 of FIG. 2 includes at least one computer Central Processing Unit (CPU) package 204 as well as random access memory 206 (RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102a-114 of FIG. 1), accelerometers, Global Positioning System (GPS) radios, LiDAR sensors, radar sensors such as radar sensors 118, 120 of FIG. 1, or other sensors. As described herein, cameras may include solid state cameras with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established. In some embodiments, other data links or communications pathways may be used instead of or in conjunction with switched fabrics 213, including cable connections between two endpoints, wireless communications links, or other data links.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212. In some embodiments, other power couplings may be used instead of or in conjunction with the switched fabric 214, such as a direct power cable coupling of a power supply 215 to another component.

Stored in RAM 206 is an autonomy engine 250. As will be described in further detail below, the autonomy engine 250 may enable autonomous driving functionality for the autonomous vehicle 100. Accordingly, in some embodiments, the autonomy engine 250 may perform various data processing or data analytics operations to enable autonomous driving functionality, including the processing of sensor data, generation of driving decisions, and the like.

Figure 2:
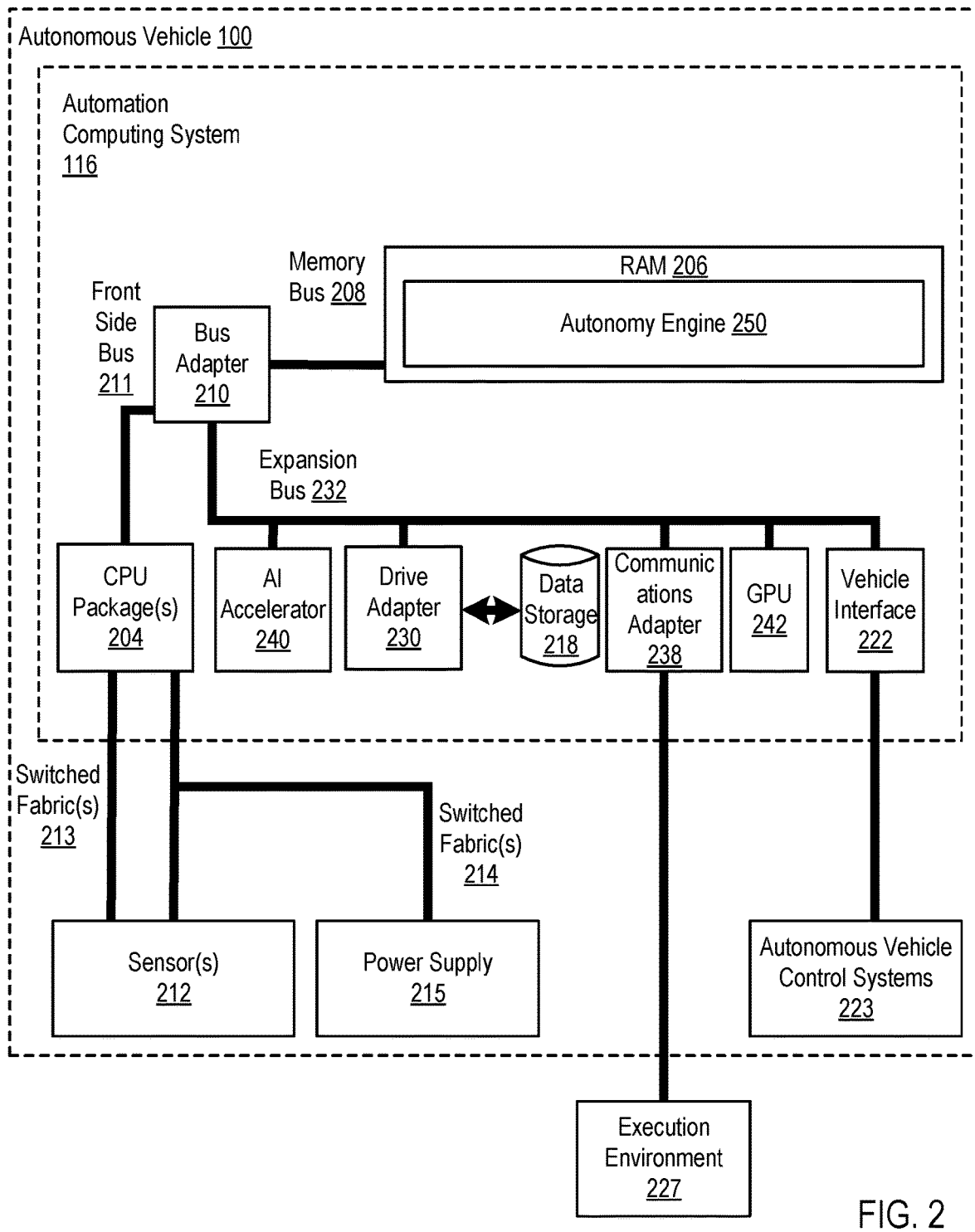
FIG. 2 is a block diagram of an autonomous computing system for autonomous vehicle model training using low-discrepancy sequences according to some embodiments of the present disclosure.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for autonomous vehicle model training using low-discrepancy sequences according to various embodiments include Integrated Drive Electronics ('IDE') adapters, Small Computer System Interface (SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for autonomous vehicle model training using low-discrepancy sequences according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, functionality of the autonomy engine 250 or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, functionality of the autonomy engine 250 or other operations of the automation computing system 116 may be performed at least in part by the GPUs 242.

Figure 3:
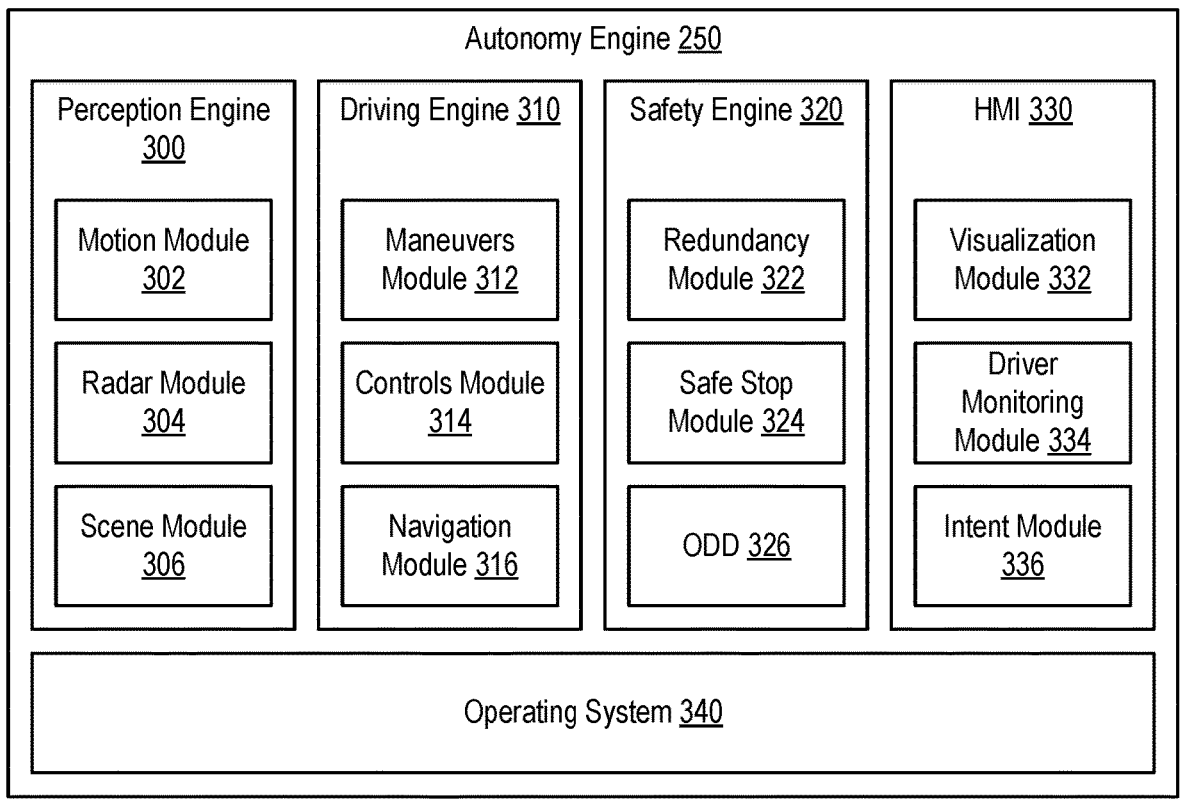
FIG. 3 is a block diagram of an example autonomy engine for autonomous vehicle model training using low-discrepancy sequences according to some embodiments of the present disclosure.

FIG. 3 shows a block diagram of an exemplary autonomy engine 250 for autonomous vehicle model training using low-discrepancy sequences according to some embodiments of the present disclosure. The autonomy engine 250 facilitates autonomous driving operations of the autonomous vehicle 100. In some embodiments, the autonomy engine 250 includes a perception engine 300. The perception engine 300 facilitates the capture and processing of sensor data from various sensors 212 in order to determine an environmental state relative to the autonomous vehicle 100. The environmental state may describe, for example, indications of objects in the environment, identification or classification of those objects, velocity and motion direction of those objects, indications and placement of particular road features including lane markers, intersections, turns, and other environmental features.

In some embodiments, the perception engine 300 includes a motion module 302. The motion module 302 uses visual information (e.g., image data from cameras) to detect objects in the environment relative to the autonomous vehicle 100 and calculate various motion attributes of those objects, including distance, velocity, and motion direction. In some embodiments, the motion module 302 may be implemented using one or more neural networks. In some embodiments, the motion module 302 may use a stereoscopic neural network that processes stereoscopic image data from a pair of cameras in a stereoscopic configuration in order to detect objects and calculate their various motion attributes. In some embodiments, the motion module 302 may use a monoscopic neural network that processes non-stereoscopic image data from individual cameras to detect objects and calculate their various motion attributes. In other words, objects may be detected, and their motion attributes calculated, without the need for image data from another camera (e.g., another camera in a stereoscopic configuration).

In some embodiments, the autonomous vehicle 100 may include complementary or fallback camera modalities usable by the motion module 302. This increases the robustness of a perception system of the autonomous vehicle 100 by allowing alternate modalities to perceive environmental conditions. As an example, there may be a left and a right camera in a stereoscopic configuration, with each camera pointed in approximately the same direction that allows the autonomous vehicle 100 to perceive objects in that direction. Different camera modes of the two cameras may allow the cameras to operate stereoscopically, monoscopically using the left camera, monoscopically using the right camera, or a combination of any of these. The autonomous vehicle 100 may use images from the cameras for a variety of purposes, such as to determine existence of objects in the environment, determine distance to objects from the autonomous vehicle, or determine velocities of objects from the autonomous vehicle. Depending on the camera modality, the autonomous vehicle 100 may use different techniques to determine environmental conditions. For example, while using a single camera, the autonomous vehicle 100 may use techniques such as object (or blob) expansion, bounding box expansion, known size position or comparison techniques, defocusing, or other techniques to determine distance or velocity of objects in the environment. When using two cameras, the autonomous vehicle 100 may use techniques such as stereoscopy to determine distance or velocity of objects in the environment.

In some embodiments, the motion module 302 may operate in a stereoscopic and monoscopic modality concurrently. Thus, for a given pair of stereoscopic cameras, the stereoscopic neural network may be used to process image data from the pair of stereoscopic cameras while the monoscopic neural network may be used to process image data from one or both cameras individually. In some embodiments, the output of each neural network may be used to reinforce or otherwise affect the output of the other. For example, a downstream component may use the output of the monoscopic neural network to verify or validate the output of the stereoscopic neural network. As another example, the similarity between output of the stereoscopic neural network and monoscopic neural network may be used to increase confidence scores or other values associated with their respective outputs. In some embodiments, as will be described in more detail below, the stereoscopic and monoscopic neural networks may be executed concurrently such that, should an error occur that prevents the use of stereoscopic imagery (e.g., a camera failure), a monoscopic neural network is already executing and has sufficient image data history so as to be useful in detecting objects and calculating their respective motion attributes.

A radar module 304 processes data from one or more radar sensors 118,120 to facilitate determining the environmental state relative to the autonomous vehicle 100. In some embodiments, a radar data cube may be generated that defines a three-dimensional space, with each portion in the three-dimensional space either having an object occupying it or being empty. Changes in radar data cubes over time may be used to detect objects and calculate their respective motion attributes as described above. In some embodiments, the radar module 304 may be used to calculate an ambient velocity of the scene relative to the autonomous vehicle 100. The ambient velocity is a collective or aggregate velocity of multiple objects in the environment, such as the autonomous vehicle 100 and other vehicles occupying the road. Accordingly, the ambient velocity may include an ambient velocity for particular lanes or the entire road as detectable by the radar sensors 118,120.

The scene module 306 determines possible actions or maneuvers performable by the autonomous vehicle 100 based on the environment relative to the autonomous vehicle. The scene module 306 may detect the environment relative to the autonomous vehicle 100 using image data from cameras, radar data, and/or other sensor data. For example, the scene module 306 may detect road features such as lane markers, changes in the road such as curvature, splits or convergence, intersections, and the like as identified in image data from cameras of the autonomous vehicle 100. Such road features may constrain maneuvers performable by the autonomous vehicle 100 (e.g., due to constraints within a particular lane), or present possible maneuvers (e.g., a possible turn at an intersection). As another example, objects identified by the motion module 302 as well as their respective motion attributes may be provided as input to the scene module 306. Such identified objects may affect or constrain possible actions or maneuvers due to risk of collision or other factors.

In some embodiments, one or more trained neural networks may be used by the scene module 306 to determine possible actions or maneuvers of the autonomous vehicle 100. For example, the possible actions or maneuvers may be determined based on a predicted environmental state (e.g., a predicted state of the road). Accordingly, in some embodiments, a neural network may be trained based on various lane and/or intersection configurations in order to predict the state of the road and determine possible actions or maneuvers. In some embodiments, the neural network may be trained using a corpus of data defining all combinations of road and intersections as limited by rules or laws for road construction. This improves the safety and performance of the autonomous vehicle 100 by ensuring that the neural network is trained on any possible road condition or configuration that the autonomous vehicle 100 may encounter. The scene module 306 allows for determination of possible actions for an autonomous vehicle 100 without requiring high-definition maps of the road traversed by the autonomous vehicle 100.

Although described as different modules, in some embodiments, each module of the perception engine 300 may affect the functionality of the other. For example, output of one module may be provided as input to another module, or output of one module may be correlated with output of another module for verification, confidence estimation, and the like. In some embodiments, the neural networks described above may be implemented as separate neural networks or combined into a same network. For example, one or more neural networks of the radar module 304 may be combined with one or more neural networks of the motion module 302 to perform their respective calculations. Various combinations or configurations of such neural networks are contemplated within the scope of the present disclosure.

The driving engine 310 determines and executes maneuvers (e.g., driving decisions) for the autonomous vehicle 100. As described herein, a maneuver describes an action or combination of actions to be performed by the autonomous vehicle 100, particularly with respect to movement of the autonomous vehicle. A maneuver may also be referred to as a driving decision, with such terms being used interchangeably herein. In some embodiments, the driving engine 310 includes a maneuvers module 312. The maneuvers module 312 determines, based on various inputs, a particular maneuver to be executed. For example, the maneuvers module 312 may receive from the scene module 306 an indication of possible maneuvers that may be performed. The maneuvers module 312 may then select a particular maneuver for execution.

In some embodiments, selecting a particular maneuver for execution may be based on costs associated with possible paths. For example, in some embodiments, selecting a particular maneuver may include optimizing one or more cost functions (e.g., by optimizing path costs). In some embodiments, path costs may be determined using one or more lattices with each lattice focusing on a different aspect of the drive (e.g., safety, comfort, efficiency). Maneuvers may then be selected for a path optimized for one or more of the lattices.

In some embodiments, the driving engine 310 includes a controls module 314. A controls module 314 generates control signals to actuate various components in order to perform maneuvers. For example, control signals may be provided via a vehicle interface 222 to autonomous vehicle control systems 223 to actuate acceleration, braking, steering, and the like in order to perform a maneuver. In some embodiments, the maneuvers module 312 may provide a particular maneuver to the controls module 314. The controls module 314 then determines and outputs the particular control signals required to perform the maneuver. As an example, assume that the maneuvers module 312 outputs a maneuver of a lane change to a lane to the left of the autonomous vehicle 100. The controls module 314 may then output a control signal to a steering system to angle the autonomous vehicle 100 some amount to the left. As another example, assume that the maneuvers module 312 outputs a maneuver to perform a right turn at an intersection. The controls module 314 may then output a control signal to the steering system to turn the car to the right and also output a control signal to the braking system to decelerate the autonomous vehicle 100 during the turn.

In some embodiments, the driving engine 310 may include a navigation module 316. The navigation module 316 may determine a route for the autonomous vehicle 100 to travel. The route may be based on a currently selected destination or based on other criteria. The route may be provided, for example, as input to a maneuvers module 312 such that maneuvers may be selected for traveling along the determined route. For example, the determined route may affect one or more cost functions associated with selecting a particular maneuver.

The safety engine 320 implements one or more features to ensure a safe driving experience when in an autonomous driving mode. In some embodiments, the safety engine 320 includes a redundancy module 322. The redundancy module 322 may detect errors associated with particular components of the autonomous vehicle 100. The redundancy module 322 may also perform remedial actions for these errors using redundant components for an erroneous component. For example, in some embodiments, the redundancy module 322 may establish or remove data or power pathways between components using switch fabrics as described above. Thus, the redundancy module 322 may establish data or power pathways to a redundant component when a corresponding component fails. This ensures that the autonomous vehicle 100 may maintain autonomous driving functionality in the event of component failure. In some embodiments, the redundancy module 322 may control different camera modalities as described above. For example, in response to detecting an error associated with a first camera in a stereoscopic configuration with a second camera, the redundancy module 322 may indicate (e.g., to the motion module 302) to operate in a monoscopic modality using the second camera. This allows the autonomous vehicle 100 to maintain autonomous driving functionality in the event of a camera failure, improving overall performance and safety.

In some embodiments, the safety engine 320 includes a safe stop module 324. The safe stop module 324 may cause the autonomous vehicle 100 to execute a safe stop maneuver. A safe stop maneuver is a sequence or combination of one or more maneuvers that will bring the autonomous vehicle 100 to a safe stop. Criteria for what is considered a safe stop may vary according to particular environmental considerations, including a type of road being traversed, traffic conditions, weather conditions, and the like. For example, a safe stop on a busy highway may include directing the vehicle to stop on the shoulder of the highway. As another example, a safe stop in a no or low traffic environment may include bringing the vehicle to an initial stop on the road before a human driver takes control.

The particular maneuvers required to execute the safe stop may be determined by the maneuvers module 312. For example, in addition to determining maneuvers to execute a particular driving path, the maneuvers module 312 may also concurrently determine maneuvers required to execute a safe stop maneuver. Thus, the maneuvers module 312 may continually update a stored sequence of maneuvers to reflect the most recently determined safe stop maneuver. In response to some condition or error state, such as critical component failure or another error that may affect safe autonomous driving, the safe stop module 324 may signal the maneuvers module 312 to execute the most recently determined safe stop maneuver. The maneuvers module 312 may then send to the controls module 314, the various maneuvers to perform the safe stop maneuver.

In some embodiments, the safety engine 320 includes an operational design domain (ODD) 326. The ODD 326 defines various operating conditions in which the autonomous vehicle 100 may operate autonomously. The ODD 326 may include, for example, particular environmental restrictions, geographical restrictions, time-of-day restrictions, and the like. The restrictions of the ODD 326 may correspond to different legal requirements, regulatory requirements, engineering considerations, and the like. The ODD 326 ensures that the autonomous vehicle 100 only operates autonomously within the bounds defined by the ODD 326, improving safety and ensuring conformity with relevant legal and regulatory restrictions. Enforcement of the ODD may include through automatic means.

The autonomy engine 250 also includes a human machine interface (HMI) 330. The HMI 330 presents various content to the driver or other occupants of the autonomous vehicle 100 and monitors the driver for various inputs that may affect driving or other systems of the autonomous vehicle 100. In some embodiments, the HMI 330 includes a visualization module 332. The visualization module 332 generates and presents for display a representation of the environment relative to the autonomous vehicle 100 as perceived by the autonomous vehicle 100 (e.g., based on data from various sensors). For example, the visualization module 332 may present a representation of detected road lanes, objects, or other relevant driving information so that an occupant can understand why the autonomous vehicle 100 is performing a particular task or maneuver. The visualization module 332 may also present for display various information relating to the state of the vehicle, such as cabin temperature, whether lights or windshield wipers are on, and the like. In some embodiments, an interior of the autonomous vehicle 100 may include a display or monitor to which the HMI 330 may provide the information or environmental representation described above.

In some embodiments, the HMI 330 includes a driver monitoring module 334. The driver monitoring module 334 monitors behaviors or actions of a driver using sensors inside and/or outside of the autonomous vehicle 100. Such sensors may include cameras, infrared sensors, pressure sensors, and the like. In other words, the driver monitoring module 334 generates sensor data capturing the driver. The driver monitoring module 334 may thus monitor behaviors or actions of a driver both inside of the vehicle and outside of the vehicle. In some embodiments, the driver monitoring module 334 may also monitor behavior or actions of other occupants of the autonomous vehicle 100. The driver monitoring module 334 may detect behaviors or actions including gestures, voice commands, posture, gaze, and the like.

In some embodiments, the HMI 330 also includes an intent module 336. The intent module 336 derives an intent of the driver using sensor data from the driver monitoring module 334. For example, one or more trained modules or neural networks may derive a particular intent based on sensor data from the driver monitoring module 334. The intent of the driver is an action the driver wishes performed by the autonomous vehicle 100. For example, assume that the driver monitoring module 334 detects a driver outside of the vehicle approaching the trunk. The intent module 336 may determine that the trunk should be opened or unlocked. As another example, assume that the driver monitoring module 334 detects a particular gesture performed by the driver during an autonomous driving mode. The intent module 336 may determine that the gesture indicates that the speed of the vehicle should be increased. Accordingly, in some embodiments, the intent module 336 may generate, based on a determined intent, one or more control signals to actuate one or more components or systems of the autonomous vehicle 100.

In some embodiments, the autonomy engine 250 includes an operating system 340. The operating system 340 may include, for example, UNIX™, Linux™, Microsoft Windows™ Android™, and others, as well as derivatives thereof. In some embodiments, the operating system 340 includes a formally verified operating system 340. Formal verification uses mathematical proof techniques to establish properties or functionality of the operating system 340. For example, formal verification may cover all lines of code or decisions, a range of all possible inputs, or other factors in operating system 340 execution. The use of a formally verified operating system 340 verifies that the operating system 340 will function correctly during operation of the autonomous vehicle 100, thereby establishing the safety and reliability of the operating system 340 during autonomous driving.

The various components of the autonomy engine 250 may be embodied or encoded according to a variety of approaches. For example, the various components and/or subcomponents of the autonomy engine 250 (e.g., the various engines and modules) may be implemented using one or more containers, one or more virtual machines, or by other approaches. Moreover, though the autonomy engine 250 is described with respect to various different engines, modules, and the like, in some embodiments portions of their respective functionality may be implemented by a same or shared module, application, service, and the like.

In some embodiments, one or more components or functions of the autonomy engine 250 may be verified using simulation or other computerized methods. For example, a simulated vehicle in a simulated road environment may be operated using an instance of the autonomy engine 250. Thus, maneuvers or driving decisions by the simulated vehicle may be controlled by the autonomy engine 250. Verification may include determining whether the simulated vehicle operates as expected, satisfies certain conditions (e.g., stays within defined lane parameters, executes maneuvers within prescribed bounds), or other actions. In some embodiments, the autonomy engine 250 may undergo verification using a variety of different scenarios where the simulated vehicle begins operation in some defined simulated environmental state. The defined simulated environmental state may include parameters such as particular road conditions or road features, placement of the simulated vehicle on the road, a speed and direction of the simulated vehicle, placement of other vehicles on the road, speeds of such vehicles, and the like. In some embodiments, the autonomy engine 250 may be verified by encoding these parameters as a multidimensional space and generating a distribution of different simulation scenarios that evenly cover the multidimensional space. This improves the safety of the autonomous vehicle 100 by verifying the autonomy engine 250 across a full and evenly distributed space of possible driving scenarios.

Figure 4:
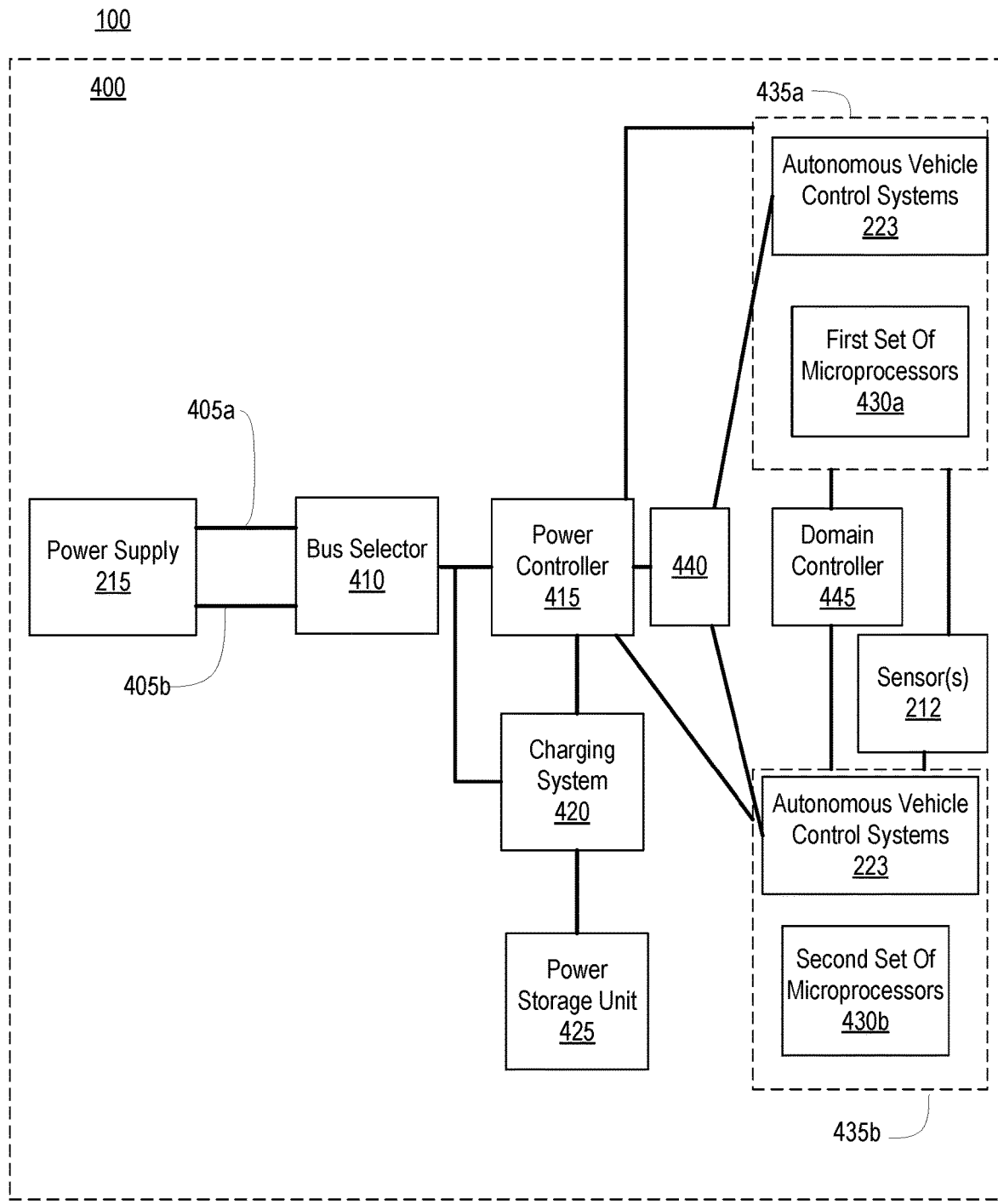
FIG. 4 is example system for redundantly supplying power to one or more microprocessors of an autonomous vehicle 100 according to some embodiments of the present disclosure.

FIG. 4 is an example system 400 for redundantly supplying power to one or more microprocessors of an autonomous vehicle 100. The system 400 includes a plurality of buses 405a, 405b (also referred to individually and collectively using reference number 405). Each bus 405 is coupled to the power supply 215 and to a bus selector 410. Further, each bus 405 of the plurality of buses 405 is independent of other buses 405 of the plurality of buses 405. While FIG. 4 shows an embodiment with two buses 405a, 405b, in other embodiments, different numbers of buses 405 are included in the system 400. For example, various embodiments include three buses 405, four buses 405, five buses 405, or any other number of buses 405.

The bus selector 410 selects one of the plurality of buses 405 as an output of the bus selector 410. The bus selector 410 is one or more integrated circuits or other logic circuits that selects one of the buses 405a, 405b as an output based on characteristics of voltage or current detected along bus 405a and bus 405b. For example, the bus selector 410 selects bus 405a as output in response to the bus selector 410 detecting a higher voltage on bus 405a than on bus 405b. Similarly, the bus selector 410 selects bus 405b as output in response to the bus selector 410 detecting a higher voltage on bus 405b than on bus 405a. In various embodiments, the bus selector 410 selects whichever bus 405 coupled to the bus selector 410 having a highest voltage as the output of the bus selector 410.

The output of the bus selector 410 is coupled to a power controller 415, which is also coupled to a power storage unit 425. In some embodiments, the output of the bus selector 410 is coupled to the power storage unit 425. The power controller 415 is a microcontroller, processor, logical circuit, field-programmable gate array (FPGA), or other structure configured to select a power output as one of the outputs of the bus selector 410 or the power storage unit 425. However, in some embodiments, such as the embodiment shown in FIG. 4, the output of the bus selector 410 is coupled to a charging system 420, with the charging system 420 coupled to the power storage unit 425. In some embodiments, the power controller 415 is coupled to the charging system 420, with the charging system 420 coupled to the power storage unit 425. However, in other embodiments, the power controller 415 is directly coupled to the power storage unit 425, and the output of the bus selector 410 is coupled to the charging system 420.

The power controller 415 selects the power output based on the output of the bus selector 410. The power output of the power controller 415 is coupled to at least one of a first power domain 435a or a second power domain 435b, with the first power domain 435a including a first set of microprocessors 430a and the second power domain 435b including a second set of microprocessors 430b. While FIG. 4 shows an example including two power domains, in other embodiments, additional power domains are coupled to the power controller 415 to increase redundancy. The power output selected by the power controller 415 is directed to at least one of the first power domain 435a or the second power domain 435b. In various embodiments, the power output is directed to a single power domain 435, with other power domains 435 not receiving power. In other embodiments, power is provided to a power domain 435a through the power output, with a portion of the power output sufficient for one or more microprocessors in the power domain 435b to operate in a standby mode directed to the power domain 435b In various embodiments, the power controller 415 selects the power output based on a voltage of the output of the bus selector 410. For example, the power controller 415 selects the power output as the output of the bus selector 410 in response to determining the voltage of the output of the bus selector 410 is at least a threshold voltage. In the preceding example, the power controller 415 selects the power output as an output of the power storage unit 425 in response to determining the voltage of the output of the bus selector 410 is less than the threshold voltage. For example, the threshold voltage is a voltage sufficient to operate at least one of the first power domain 435a or the second power domain 435b. In some embodiments, the threshold voltage is specified as a voltage sufficient to operate the first set of microprocessors 430a or the second set of microprocessors 430b for at least a threshold amount of time. The threshold voltage is stored in a memory of the power controller 415 in various embodiments, allowing different systems 400 to specify different threshold voltages for selecting the power output of the power controller 415.

In various embodiments, the threshold voltage stored by the power storage unit 425 is sufficient to power the first power domain 435a or the second power domain 435b for a threshold amount of time for the autonomous vehicle 100 to complete a minimal risk condition. As used herein, a "minimal risk condition" specifies one or more actions for the autonomous vehicle 100 to complete while an autonomous mode to allow a driver to resume manual control of the autonomous vehicle 100 or for the autonomous vehicle 100 to safely come to a stop while in the autonomous mode. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 Is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions. Both the first power domain 435a and the second power domain 435b are capable of providing instructions for completing the minimal risk condition.

The charging system 420 provides power from the output of the bus selector 410 to the power storage unit 425. This causes the output of the bus selector 410 to charge the power storage unit 425, allowing the power storage unit 425 to store power from the power supply 215 received via the output of the bus selector 410. In some embodiments, the charging system 420 obtains charging information from the power storage unit 425 and adjusts charging of the power storage unit 425 accordingly. For example, the charging system 420 obtains a current voltage from the power storage unit 425 and determines whether a current voltage of the power storage unit 425 is less than a threshold voltage.

The power storage unit 425 is a device configured to store power. Examples of the power storage unit 425 include a battery or a capacitor. In various embodiments, the power storage unit 425 is configured to store a minimum voltage for operating at least one of the first set of microprocessors 430a or the second set of microprocessors 430b. For example, the power storage unit 425 is configured to store a voltage capable of operating at least one of the first set of microprocessors 430a or the second set of microprocessors 430b for at least a threshold amount of time. The power storage unit 425 receives power from the output of the bus selector 410, so the power storage unit 425 accumulates power received from output of the bus selector 410. This allows the power storage unit 425 to act as an alternative power source that is charged while at least one of the buses 405 is supplying power as the output of the bus selector 410 and is used when the output of the bus selector 410 satisfies one or more criteria (e.g., when the output of the bus selector 410 has less than a threshold voltage). In different embodiments, the power storage unit 425 has different power storage capacities or charges at different rates. While FIG. 4 shows a single power storage unit 425 for purposes of illustration, in other embodiments, the system 400 includes multiple power storage units 425 coupled to the output of the bus selector 410 and to the power controller 415.

In the embodiment shown in FIG. 4, the power output of the power controller is coupled to a control bus 440 that comprises connections between the power controller 415 and each of at least a collection of autonomous vehicle control systems 223 to route power from the power storage unit 425 to at least the collection of autonomous vehicle control systems 223. Inclusion of the control bus 440 simplifies routing of power from the power storage unit 425 to different autonomous vehicle control systems 223. In some embodiments, the threshold amount of power stored by the power storage unit 425 is sufficient to operate the collection of autonomous vehicle control systems 223 and one of the first set of microprocessors 430a or the second set of microprocessors 430b for a sufficient amount of time for the autonomous vehicle 100 to complete a minimum risk condition. The collection of autonomous vehicle control systems 223 includes one or more autonomous vehicle control systems 223 capable of completing a minimal risk condition and capable of modifying movement of the autonomous vehicle 100. For example, the collection of systems 223 includes a braking system and a steering system. One or more lighting systems may be included in the collection of autonomous vehicle control systems 223 in various implementations. The collection of autonomous vehicle control systems 223 excludes one or more autonomous vehicle control systems, such as an entertainment system or a heating and air conditioning control system, in various embodiments.

A domain controller 445 is coupled to the first power domain 435a and to the second power domain 435b. The domain controller 445 includes switching logic that redirects power from the power output of the power controller 415 to the first power domain 435a or to the second power domain 435b based on one or more conditions. For example, the domain controller 445 routes power that the first power domain 435a receives from the power output of the power controller 415 to the second power domain 435b in response to one or more microprocessors in the first power domain 435a providing less than a threshold amount of functionality. In various embodiments, the domain controller 445 monitors the first power domain 435a and the second power domain 435b and determines whether the first power domain 435a or the second power domain 435b is capable of providing instructions for the autonomous vehicle to complete a minimal risk condition using at least the collection of the autonomous vehicle control systems 223 that control movement of the autonomous vehicle 100 while the autonomous vehicle 100 is in an autonomous mode based on instructions provided by the first set of microprocessors 430a or by the second set of microprocessors 430b. In response to determining the first power domain 435a is not capable of providing instructions to at least the collection of autonomous vehicle control systems 223 to complete the minimal risk condition, the domain controller 445 routes power from the first power domain 435a to the second power domain 435b. Similarly, in response to determining the second power domain 435b is not capable of providing instructions to at least the collection of autonomous vehicle control systems 223 to complete the minimal risk condition, the domain controller 445 routes power from the second power domain 435b to the first power domain 435a. The domain controller 445 allows the power output of the power controller 415 to be routed to a power domain 435 capable of completing a minimal risk condition, providing redundancy for the autonomous vehicle completing a minimal risk condition while in an autonomous mode. This allows the domain controller 445 to direct the power output to a power domain 435 capable of executing functionality for completing a minimal risk condition, providing additional safety for a driver of the autonomous vehicle 100.

Figure 5:
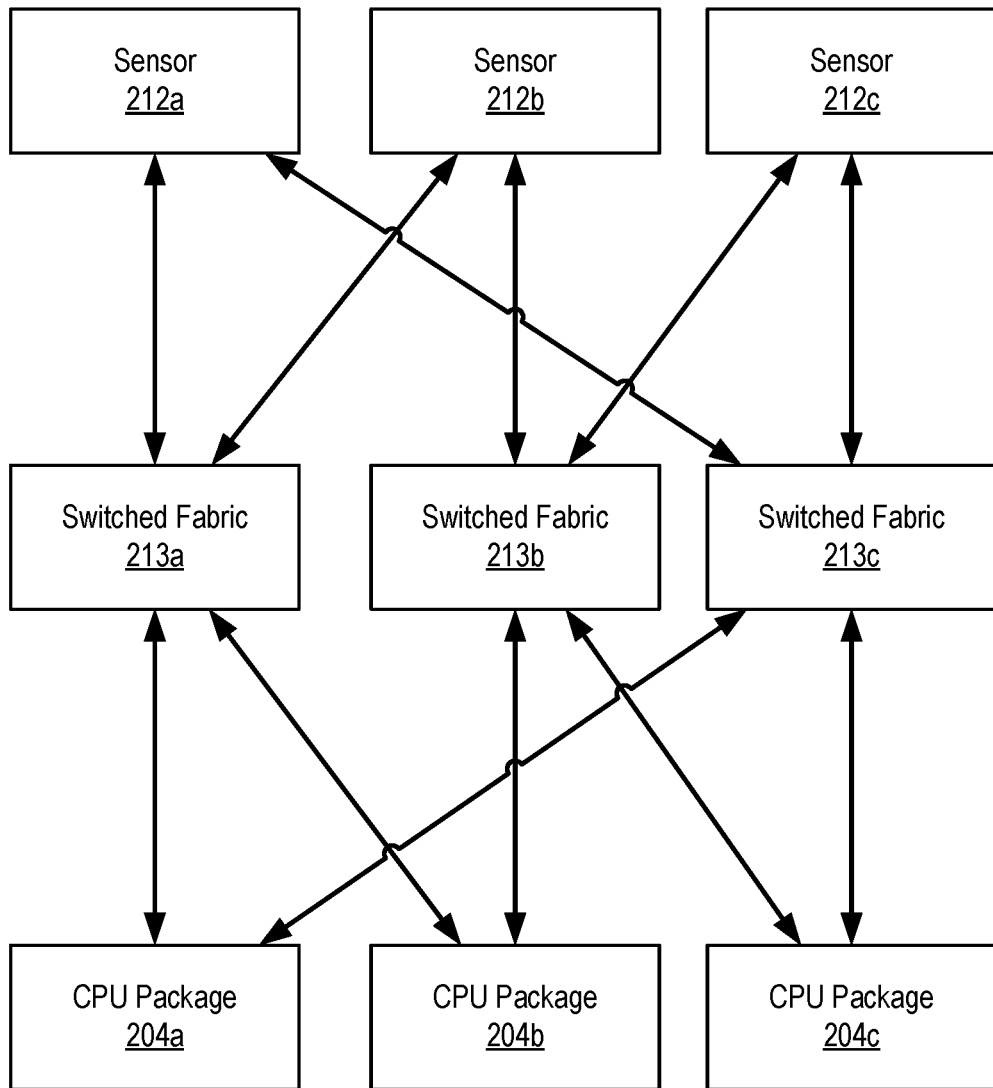
FIG. 5 is a block diagram of a redundant data fabric for autonomous vehicle model training using low-discrepancy sequences according to some embodiments of the present disclosure.

FIG. 5 shows an example redundant power fabric for autonomous vehicle model training using low-discrepancy sequences. The redundant power fabric provides redundant pathways for power transfer between the power supplies 215, the sensors 212, and the CPU packages 204. In this example, the power supplies 215 are coupled to the sensors 212 and CPU packages via two switched fabrics 214*a* and 214*b*. The topology shown in FIG. 5 provides redundant pathways between the power supplies 215, the sensors 212, and the CPU packages 204 such that power can be rerouted through any of multiple pathways in the event of a failure in an active connection pathway. The switched fabrics 214*a* and 214*b* may provide power to the sensors 212 using various connections, including Mobile Industry Processor Interface (MIPI), Inter-Integrated Circuit (I2C), Universal Serial Bus (USB), or another connection. The switched fabrics 214*a* and 214*b* may also provide power to the CPU packages 204 using various connections, including Peripheral Component Interconnect Express (PCIe), USB, or other connections. Although only two switched fabrics 214*a* and 214*b* are shown connecting the power supplies 215 to the sensors 212 and CPU packages 204, the approach shown by FIG. 5 can be modified to include three, four, five, or more switched fabrics 214. This example redundant power fabric improves the safety and reliability of the autonomous vehicle 100 by allowing for dynamic switching of power pathways to ensure that each component may receive the required power for operation should a power connection be damaged or otherwise negatively impacted.

Figure 6:
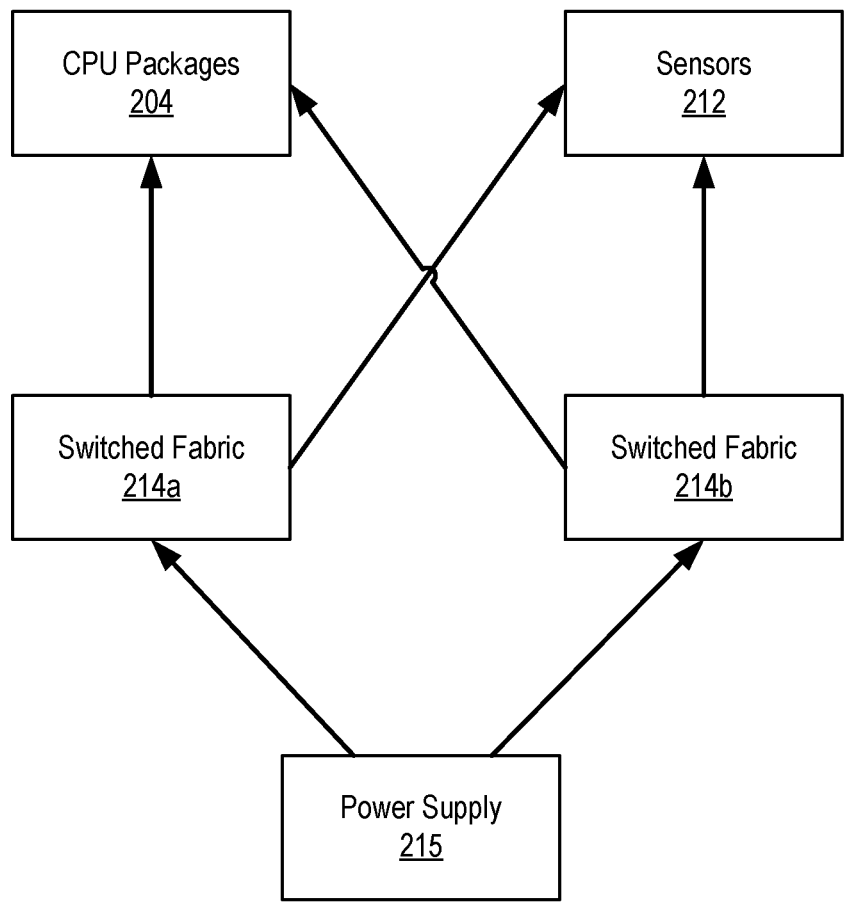
FIG. 6 is a block diagram of a redundant power fabric for autonomous vehicle model training using low-discrepancy sequences according to some embodiments of the present disclosure.

FIG. 6 is an example redundant data fabric for autonomous vehicle model training using low-discrepancy sequences. The redundant data fabric provides redundant data connection pathways between sensors 212 and CPU packages 204. In this example view, three CPU packages 204*a*, 204*b*, and 204*c* are connected to three sensors 212*a*, 212*b*, and 212*c* via three switched fabrics 213*a*, 213*b*, and 213*c*. Each CPU package 204*a*, 204*b*, and 204*c* is connected to a subset of the switched fabrics 213*a*, 213*b*, and 213*c*. For example, CPU package 204*a* is connected to switched fabrics 213*a* and 213*c*, CPU package 204*b* is connected to switched fabrics 213*a* and 213*b*, and CPU package 204*c* is connected to switched fabrics 213*b* and 213*c*. Each switched fabric 213*a*, 213*b*, and 213*c* is connected to a subset of the sensors 212*a*, 212*b*, and 212*c*. For example, switched fabric 213*a* is connected to sensors 212*a* and 212*b*, switched fabric 213*b* is connected to sensor 212*b* and 212*c*, and switched fabric 213*c* is connected to sensors 212*a* and 212*c*. Under this topology, each CPU package 204*a*, 204*b*, and 204*c* has an available connection path to any sensor 212*a*, 212*b*, and 212*c*. It is understood that the topology of FIG. 6 is exemplary, and that CPU packages, switched fabrics, sensors, or connections between components may be added or removed while maintaining redundancy. This example redundant data fabric improves the safety and reliability of the autonomous vehicle 100 by allowing for the use of redundant sensors and processors that may be dynamically linked via the redundant data fabric in response to an error or other condition.

Figure 7:
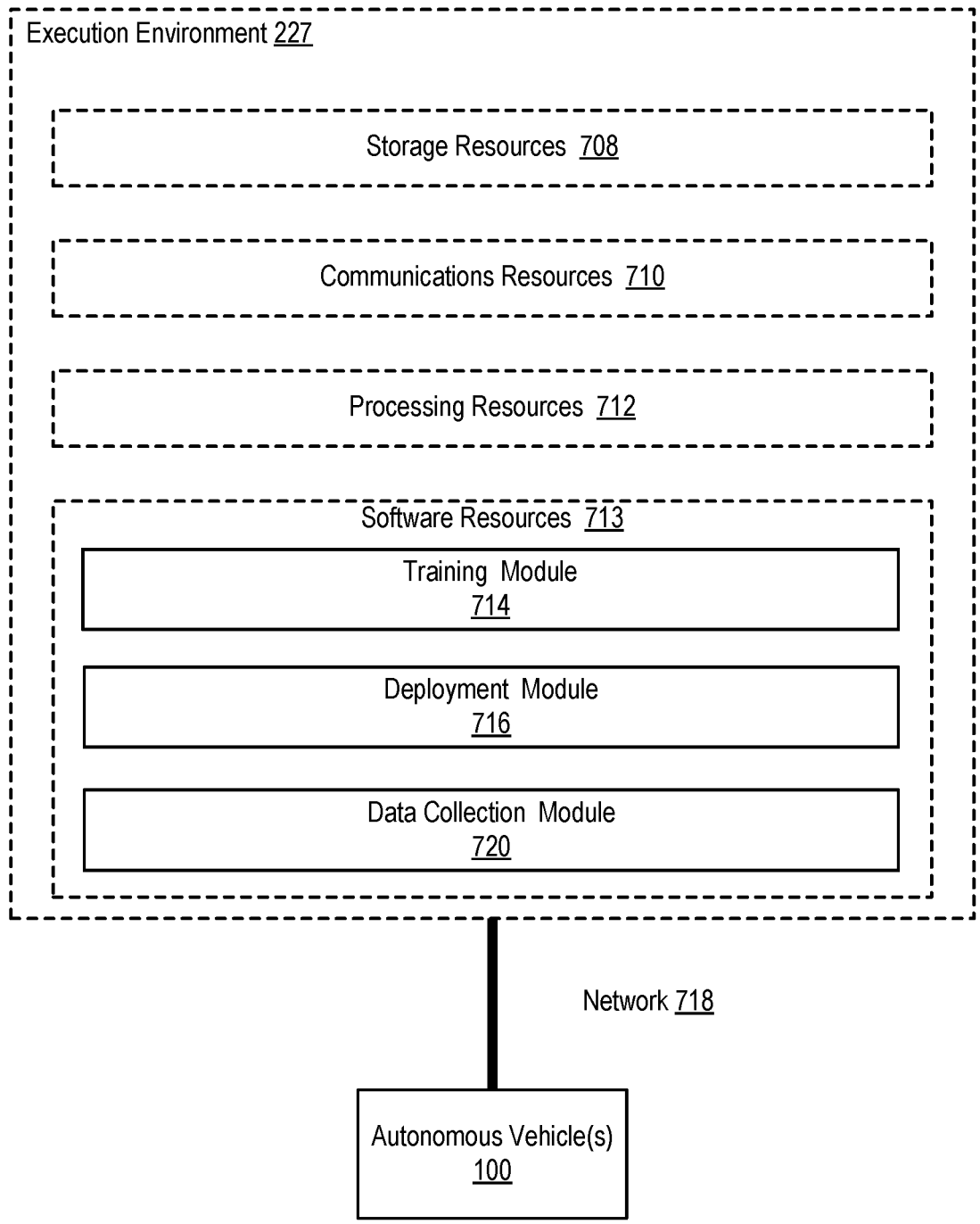
FIG. 7 is an example view of an execution environment for autonomous vehicle model training using low-discrepancy sequences according to some embodiments of the present disclosure.

For further explanation, FIG. 7 sets forth a diagram of an execution environment 227 in accordance with some embodiments of the present disclosure. The execution environment 227 depicted in FIG. 7 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 7 may include storage resources 708, which may be embodied in many forms. For example, the storage resources 708 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 708 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 7 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders and presented to both the system storing it and the system retrieving it in the same format.

The execution environment 227 depicted in FIG. 7 also includes communications resources 710 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 710 may be configured to utilize a variety of different protocols and data communication fabrics to facilitate data communications. For example, the communications resources 710 may utilize Internet Protocol (IP') based technologies, fibre channel (FC) technologies, FC over ethernet (FCoE) technologies, InfiniBand (IB) technologies, NVM Express (NVMe) technologies and NVMe over fabrics (NVMeoF) technologies, and many others. The communications resources 710 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle 100).

The execution environment 227 depicted in FIG. 7 also includes processing resources 712 that may be useful in useful in executing computer program instructions and performing other computational tasks within the execution environment 227. The processing resources 712 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 712. The processing resources 712 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 7 also includes software resources 713 that, when executed by processing resources 712 within the execution environment 227, may perform various tasks. The software resources 713 may include, for example, one or more modules of computer program instructions that when executed by processing resources 712 within the execution environment 227 are useful in training neural networks configured to determine control autonomous vehicle control operations. For example, a training module 714 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 714 may provide a corpus of training data, or a selected subset of training data, to train the neural network. For example, the training module 714 may select particular subsets of training data associated with particular driving conditions, environment states, etc. to train the neural network.

The software resources 713 may include, for example, one or more modules of computer program instructions that when executed by processing resources 712 within the execution environment 227 are useful in deploying software resources or other data to autonomous vehicles 100 via a network 718. For example, a deployment module 716 may provide software updates, neural network updates, or other data to autonomous vehicles 100 to facilitate autonomous vehicle control operations.

The software resources 713 may include, for example, one or more modules of computer program instructions that when executed by processing resources 712 within the execution environment 227 are useful in collecting data from autonomous vehicles 100 via a network 718. For example, a data collection module 720 may receive, from autonomous vehicles 100, collected sensor 212, associated control operations, software performance logs, or other data. Such data may facilitate training of neural networks via the training module 714 or stored using storage resources 708.

Figure 8:
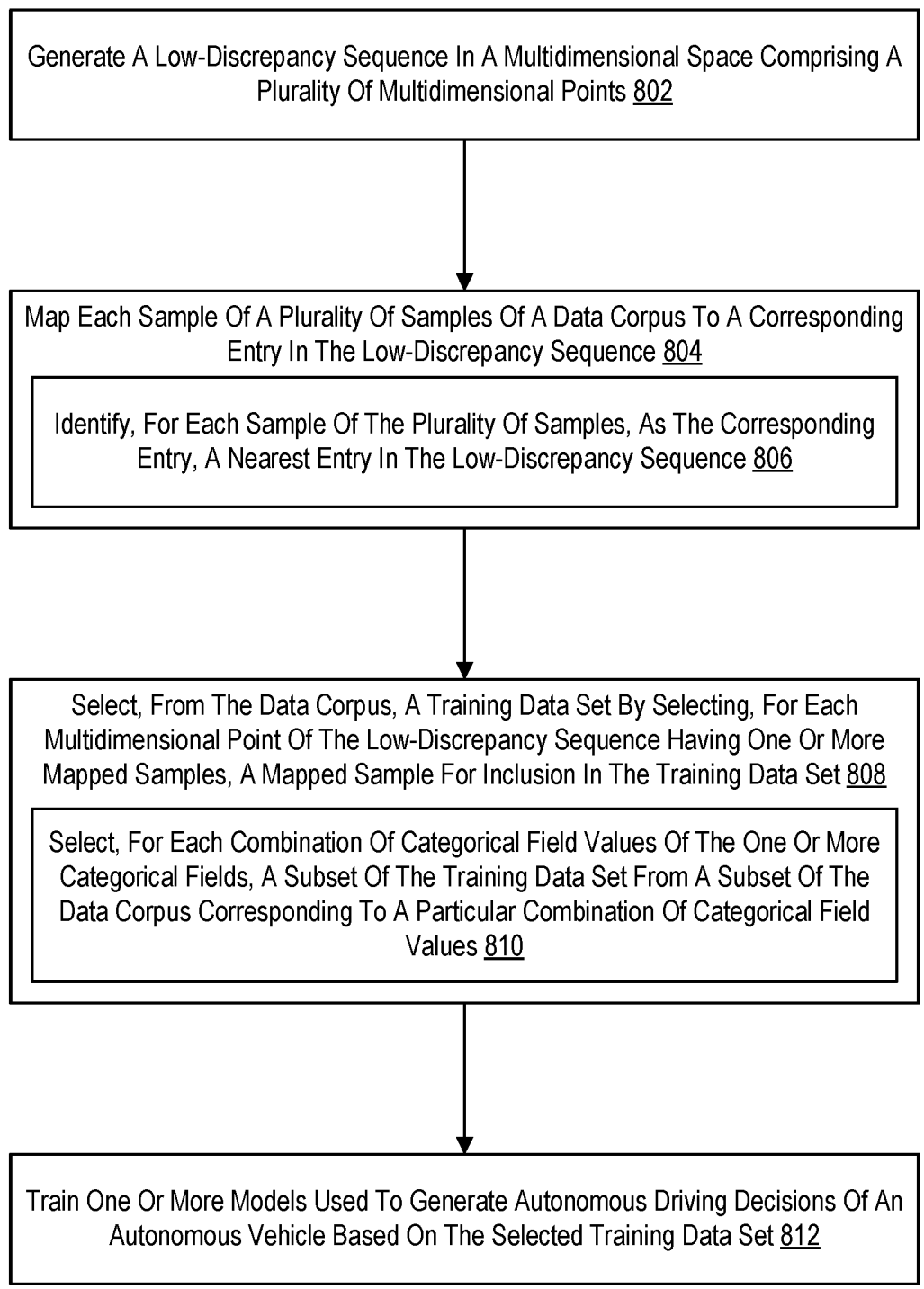
FIG. 8 is a flow chart of an example method for autonomous vehicle model training using low-discrepancy sequences according to some embodiments of the present disclosure.

For further explanation, FIG. 8 sets forth a flow chart illustrating an exemplary method for autonomous vehicle model training using low-discrepancy sequences according to some embodiments of the present disclosure. The method of FIG. 8 may be performed, for example, by an execution environment such as the execution environment of FIG. 7, or another system of computing devices or compute resources as can be appreciated. The method of FIG. 8 includes generating 802 a low-discrepancy sequence in a multidimensional space comprising a plurality of multidimensional points. The low-discrepancy sequence may include a low-discrepancy sequence or a quasi-random low-discrepancy sequence such that the resulting sequence is evenly distributed in the multidimensional space. For example, in some embodiments, the low-discrepancy sequence may include a Sobol sequence that will be evenly distributed in the multidimensional space. In some embodiments, other low-discrepancy sequences may be used, such as a Monte Carlo sequence or quasi-Monte Carlo sequence.

In some embodiments, the dimensionality of the low-discrepancy sequence (e.g., the number of dimensions in the multidimensional space) may be based on the fields of a particular data corpus. As will be described in further detail below, the low-discrepancy sequence may be used to select a training data set from a data corpus. The data corpus may include multiple samples each having a number of fields with a corresponding stored value. In some embodiments, the samples may include one or more continuous fields, with each sample having a corresponding continuous value for each continuous field. A continuous value is a continuous numerical value. For example, in some embodiments, a particular continuous field may be constrained by some defined range. The continuous values for the particular continuous field may include any number that falls within the predefined range. As another example, in some embodiments, a particular continuous field may not be bound by a range. In some embodiments, the samples may include one or more categorical fields with corresponding categorical values. A categorical value for a particular categorical field is selected from an enumeration of multiple possible categorical values (e.g., categories, labels, and the like) for that particular categorical field.

Accordingly, in some embodiments, the dimensionality of the low-discrepancy sequence may correspond to a number of continuous fields for the samples of the data corpus. For example, where the data corpus includes samples having N continuous fields, the low-discrepancy sequence may be generated 802 in a multidimensional space having N dimensions. Thus, each dimension in the low-discrepancy sequence may correspond to a particular continuous field in the data corpus. In some embodiments, the dimensionality of the low-discrepancy sequence may correspond to a number of continuous fields in a subset of the continuous fields. For example, in some embodiments, one or more of the continuous fields may be identified as being excluded or otherwise irrelevant when selecting samples from the data corpus, such as when samples are selected based on some schema selecting a subset of fields. Continuing with this example, assume that the low-discrepancy sequence will be used for selecting a training data set from the data corpus. Further assume that certain continuous fields are either identified as being irrelevant to the training data set, or that certain continuous fields of the data corpus will be excluded from the selected training data set. Such continuous fields are hereinafter referred to as "excluded continuous fields."

As an example, assume that the data corpus includes samples storing sensor data of a sensor-equipped vehicle, with the samples including one or more continuous fields indicating a geographic location at which the sensor data was generated or gathered. As the geographic location of where sensor data was gathered may not be relevant or useful in training a model (e.g., a model for autonomous driving), the continuous fields indicating the geographic location may be designated as excluded continuous fields. As another example, assume that a request for selecting training data from the data corpus indicates a particular subset of categorical fields to be included in the selected training data. Continuous fields not particularly indicated in the request may then be treated as excluded continuous fields. Thus, each dimension in the low-discrepancy sequence may correspond to a particular continuous field not otherwise excluded or omitted. Accordingly, in some embodiments, the low-discrepancy sequence may be generated 802 as having a number of dimensions equal to the number of continuous fields of the data corpus less the number of excluded continuous fields. For example, assuming a data corpus of N continuous fields and M excluded continuous fields, the low-discrepancy sequence may be generated 802 as having (N-M) dimensions.

Where the data corpus includes one or more categorical fields, the low-discrepancy sequence may be generated 802 independent of the number of categorical fields. In other words, the number of categorical fields in the data corpus may not affect the dimensionality of the low-discrepancy sequence. In other embodiments, the low-discrepancy sequence may be generated as having a number of dimensions based on the number of categorical fields. For example, the low-discrepancy sequence may be generated as having a number of dimensions equal to the total number of categorical and continuous fields or as having a number of dimensions equal to the total number of categorical and continuous fields less any excluded continuous and/or categorical fields. Such excluded categorical fields may be determined or identified according to similar approaches as are set forth above with respect to excluded continuous fields. In some embodiments, the dimensionality of the low-discrepancy sequence may be determined or calculated according to other approaches, with such approaches being based on or independent of the number of categorical fields and/or continuous fields in the data corpus.

The low-discrepancy sequence includes multiple multi-dimensional points (e.g., entries). In some embodiments, the number of entries for the low-discrepancy sequence may include a predefined number. In some embodiments, the number of entries for the low-discrepancy sequence may include a randomly generated or dynamically calculated number. In some embodiments, the number of entries for the low-discrepancy sequence may correspond to or be based on an input number. For example, in some embodiments, as will be described in further detail below, the number of entries for the low-discrepancy sequence may be based on a request to select a number of samples from the data corpus (e.g., as a training data set). The number of entries in the low-discrepancy sequence may also be calculated according to other approaches.

The method of FIG. 8 also includes mapping 804 each sample of a plurality of samples of a data corpus to a corresponding entry in the low-discrepancy sequence. As referred to herein, the plurality of samples of the data corpus may include the entirety of the data corpus or a particular (e.g., designated or dynamically determined) subset of the data corpus. In some embodiments, the data corpus may include data generated by a sensor-equipped vehicle, such as an autonomous vehicle or other sensor-equipped vehicle. For example, the samples in the data corpus may include sensor data (e.g., particular measurements or other generated data) generated by various sensors of the vehicle, including accelerometers, gyroscopes, GPS radios, cameras, radar, LiDAR, sensors monitoring the operational state of various components of the vehicle, and the like.

In some embodiments, the samples in the data corpus may include one or more environmental descriptors describing an environment relative to a vehicle (e.g., an ego sensor-equipped vehicle) at a particular time. For example, the one or more environmental descriptors may include indications of one or more distances from the vehicle to one or more other objects, including distances to other vehicles, lane markers or other road features, and the like. As another example, the one or more environmental descriptors may include an indication of a number of other objects detected, including a number of other vehicles detected. As a further example, the one or more environmental descriptors may include descriptions or measurements of temperature, light, weather, and the like. As yet another example, the one or more environmental descriptors may indicate a time at which the sensor data was generated. Each of the environmental descriptors may be expressed as a categorical value or a continuous value, and therefore correspond to a categorical field or continuous field, depending on the particular environmental descriptor and/or particular design considerations.

In some embodiments, the samples in the data corpus may include one or more state descriptors describing a state of the vehicle at a particular time. For example, the one or more state descriptors may include a velocity of the vehicle. As another example, the one or more state descriptors may include an amount of acceleration and/or braking being applied. As a further example, the one or more state descriptors may describe the heading of the vehicle, including the heading or angle of the vehicle relative to the road. As an additional example, the one or more state descriptors may include a degree of rotation of one or more wheels of the vehicle. As yet another example, the one or more state descriptors may indicate an operational state of one or more components or systems of the vehicle (e.g., whether the components are currently activated or deactivated, whether the components are functioning properly, detected errors, descriptive attributes), such as lights, tires, brakes, and the like.

In some embodiments, the samples in the data corpus may include one or more fields other than the categorical or continuous fields described above. For example, the samples in the data corpus may include one or more images, sound or video samples, or other data encoding measurements or samples generated by particular sensors (e.g., data encoding radar or LiDAR measurements). In some embodiments, the samples in the data corpus may include references (e.g., as file names or storage locations) to such data. Accordingly, though such fields may be included in the data corpus, the low-discrepancy sequence may be generated independent of such fields while a selected data set (e.g., selected training data set) may include the data corresponding to such fields.

Mapping 804 each sample of the plurality of samples of the data corpus to a corresponding entry in the low-discrepancy sequence results in each sample of the plurality of samples being associated (e.g., mapped) with some entry in the low-discrepancy sequence. Each entry in the low-discrepancy sequence is then mapped to zero or more samples in the plurality of samples of the data corpus. In some embodiments, mapping 804 each sample of the plurality of samples of the data corpus to a corresponding entry in the low-discrepancy sequence includes identifying 806, for each sample of the plurality of samples, as the corresponding entry, a nearest entry in the low-discrepancy sequence. For example, in some embodiments, a distance between a particular entry in the low-discrepancy sequence and a particular sample may be calculated or expressed as a Euclidian distance in the multidimensional space. As is set forth above, each dimension of the multidimensional space, and therefore the low-discrepancy sequence, may correspond to a particular continuous field of the data corpus. Accordingly, each sample in the plurality of samples may also be expressed as a point in the multidimensional space based on the values of these continuous fields. The distance between a particular entry in the low-discrepancy sequence and a particular sample may then be calculated as the distance between their respective points in multidimensional space (e.g., using Euclidian distance or some other distance function).

In some embodiments, one or more continuous fields of the data corpus may be encoded as values that are not normalized or scaled relative to the low-discrepancy sequence. In other words, the data corpus may occupy areas of the multidimensional space outside of the constraints of the low-disparity sequence. For example, assume that the low-discrepancy sequence includes a Sobol sequence. In a Sobol sequence, the value for each dimension of a multidimensional point is a value from zero to one. In other words, each multidimensional point of N dimensions includes N values from zero to one. Further assume that, for a given continuous field, the range of values for that continuous field falls within a different range. For example, for a continuous field for vehicle velocity, the values in the data corpus may range from zero to one-hundred miles-per-hour (mph). Accordingly, values for the velocity continuous field should be scaled such that they fall within the zero-to-one range of the corresponding dimension in the Sobol sequence. Continuing with this example, a velocity of twenty-five mph may be scaled to 0.25, while a velocity of seventy mph may be scaled to 0.75. As another example, assume a continuous field for an offset of a vehicle relative to the center of the lane. Further assume that this continuous field has a range of values of −1.8 (e.g., offset 1.8 meters to the left) to 1.8 meters (offset 1.8 meters to the right), with a value of zero meaning the vehicle is perfectly centered in the lane. Values for this continuous field may then be scaled to the zero-to-one range. For example, an offset of −1.8 meters would scale to zero, an offset of 1.8 meters would scale to 1.0, an offset of zero would scale to 0.5, and the like.

In some embodiments, values for each continuous field may be scaled to a range for dimensional values in the low-discrepancy sequence. Thus, the continuous fields of the data corpus are scaled to the space of the low-discrepancy sequence. In some embodiments, scaling the continuous fields may be performed as part of a background process or another process independent of requests to select a data set from the data corpus as mapped to the low-discrepancy sequence. For example, in some embodiments, as samples are stored in the data corpus, a process may scale the continuous field values such that data sets may be later mapped to some low-discrepancy sequence, allowing a request for a data set to be serviced without requiring scaling of each continuous value in the entire data corpus. In some embodiments, the continuous values for the data corpus may be scaled in response to requests to select a data set from the data corpus as mapped to the low-discrepancy sequence. Accordingly, in some embodiments, a temporary instance of the data corpus having scaled continuous values may be generated and mapped to the low-discrepancy sequence. Thus, as is described below, a data set may be selected as including samples from this temporary, scaled instance of the data corpus. The scaled continuous values in the selected data set may then have their scaling reversed so as to restore them to their value prior to scaling. As another example, samples in the scaled, temporary instance of the data corpus may be selected based on the mapping to the low-discrepancy sequence, with their corresponding, unscaled samples in the data corpus added to the selected data set.

The method of FIG. 8 also includes selecting 808, from the data corpus, a training data set by selecting, for each multidimensional point of the low-discrepancy sequence having one or more mapped samples, a mapped sample for inclusion in the training data set. For example, where a given multidimensional point has a single mapped sample, the single mapped sample may be included in the training data set. As another example, where a given multidimensional point has multiple mapped samples that may be selected, one of the multiple mapped samples may be selected for inclusion in the training data set randomly, based on one or more rules, or by another approach.

In some embodiments, the size of the training data set (e.g., a number of included samples or entries) to be selected may affect a number of entries in the low-discrepancy sequence. For example, where a training data set of N samples is to be selected, the low-discrepancy sequence may be generated to have N entries, with each entry in the low-discrepancy sequence having a corresponding mapped entry included in the training data set. Such an approach may be used, for example, where the data corpus has no categorical fields or the training data set is selected as having no categorical fields (e.g., based on a schema lacking categorical fields).

Where the training data set, and by extension the data corpus, includes one or more categorical fields, selecting 808 the training data set may include selecting 810, for each combination of categorical field values of the one or more categorical fields, a subset of the training data set from a subset of the data corpus corresponding to a particular combination of categorical field values. In other words, for each enumerated combination of values for the one or more categorical fields, a corresponding subset of the training data set is selected from a subset of the data corpus whose entries match the enumerated combination. In some embodiments, the subset of the training data set for a particular combination of categorical field values is selected by selecting, for each entry in the low-discrepancy sequence, a mapped entry in the data corpus having categorical field values equal to the particular combination of categorical field values.

Consider an example where a training data set is to be selected from a data corpus having two categorical fields each having two possible values. In this example, assume that a first categorical field has possible values of A and B while a second categorical field has possible values of C and D. The resulting combinations of categorical field values are pairs A/C, A/D, B/C, and B/D. Here, the training data set is selected by selecting a first subset of the training data set from data corpus entries having categorical field values of A/C. A second subset of the training data set is selected from data corpus entries having categorical field values of A/D. A third subset of the training data set is selected from data corpus entries having categorical field values of B/C. A fourth subset of the training data set is selected from data corpus entries having categorical field values of B/D.

In some embodiments, the size of the training data set and the number of combinations of categorical field values may affect the number of entries in the low-discrepancy sequence. For example, in some embodiments, the size of the training data set may correspond to the number of entries in the low-discrepancy sequence multiplied by the number of combinations of categorical field values. Continuing with the example above, two categorical fields each having two possible values results in four combinations of categorical field values. Assuming a low-discrepancy sequence of N entries, the training data set may be selected as having 4*N samples. In other words, in order to select a training data set having M samples and assuming four combinations of categorical field values, a low-discrepancy sequence of M/4 entries may be generated.

In some embodiments, an entry in the low-discrepancy sequence may not have a particular mapped sample for inclusion in the training data set. For example, a particular entry in the low-discrepancy sequence may not have any mapped samples or may not have a mapped sample in a particular subspace (e.g., a subspace defined by a particular combination of categorical field values as described above). In some embodiments, where a particular entry does not have the particular mapped sample, no sample for that particular entry may be added to the training data set. Thus, when selecting a training data set of a particular size, the resulting training data set may have fewer samples than the particular size. In other embodiments, as will be described in further detail below, a synthetic training data entry may be generated and included in the training data set.

The method of FIG. 8 also includes training 812 one or more models used to generate autonomous driving decisions of an autonomous vehicle based on the selected training data set. In other words, the selected training data set is used as training data for the one or more models. As an example, the one or more models may include one or more models that themselves provide, as output, an autonomous driving decision. As another example, the one or more models may include one or more models that may be used in combination with other models to generate autonomous driving decisions (e.g., models for detecting or identifying objects, estimating distances to objects, estimating the velocity of objects, and the like).

By selecting a training data set using a mapping to an evenly distributed low-discrepancy sequence, the resulting training data set is evenly distributed in its particular domain. By selecting multiple subsets of the training data set for each combination of categorical field values, each subset of the training data set is itself evenly distributed in their respective multidimensional subspaces. This results in a higher degree of coverage for the training data, ensuring that the models are trained across an even distribution of scenarios. This is in contrast to other approaches for selecting a training data set (e.g., randomly or using some other distribution) as variations in the density of the data corpus samples may be reflected in the training data set. This may result in the model being inadequately trained in scenarios where the density of corresponding data corpus samples is lower. For example, a model for autonomous driving may be inadequately trained for particular driving conditions. When deployed in an autonomous vehicle, such a model may generate incorrect determinations or driving decisions when experiencing the particular driving conditions for which it was inadequately trained, which may result in undesirable or unsafe action by the autonomous vehicle. Thus, the approaches set forth above provide for an improvement in the functioning of autonomous vehicles and in training autonomous driving models.

Although the approaches set forth herein are described with respect to training models for autonomous driving using vehicle-specific training data, such approaches are applicable to other models and training data. Accordingly, any data corpus may be mapped to a low-discrepancy sequence as described above such that a training data set may be selected using the samples mapped to the entries in the low-discrepancy sequence.

Figure 9:
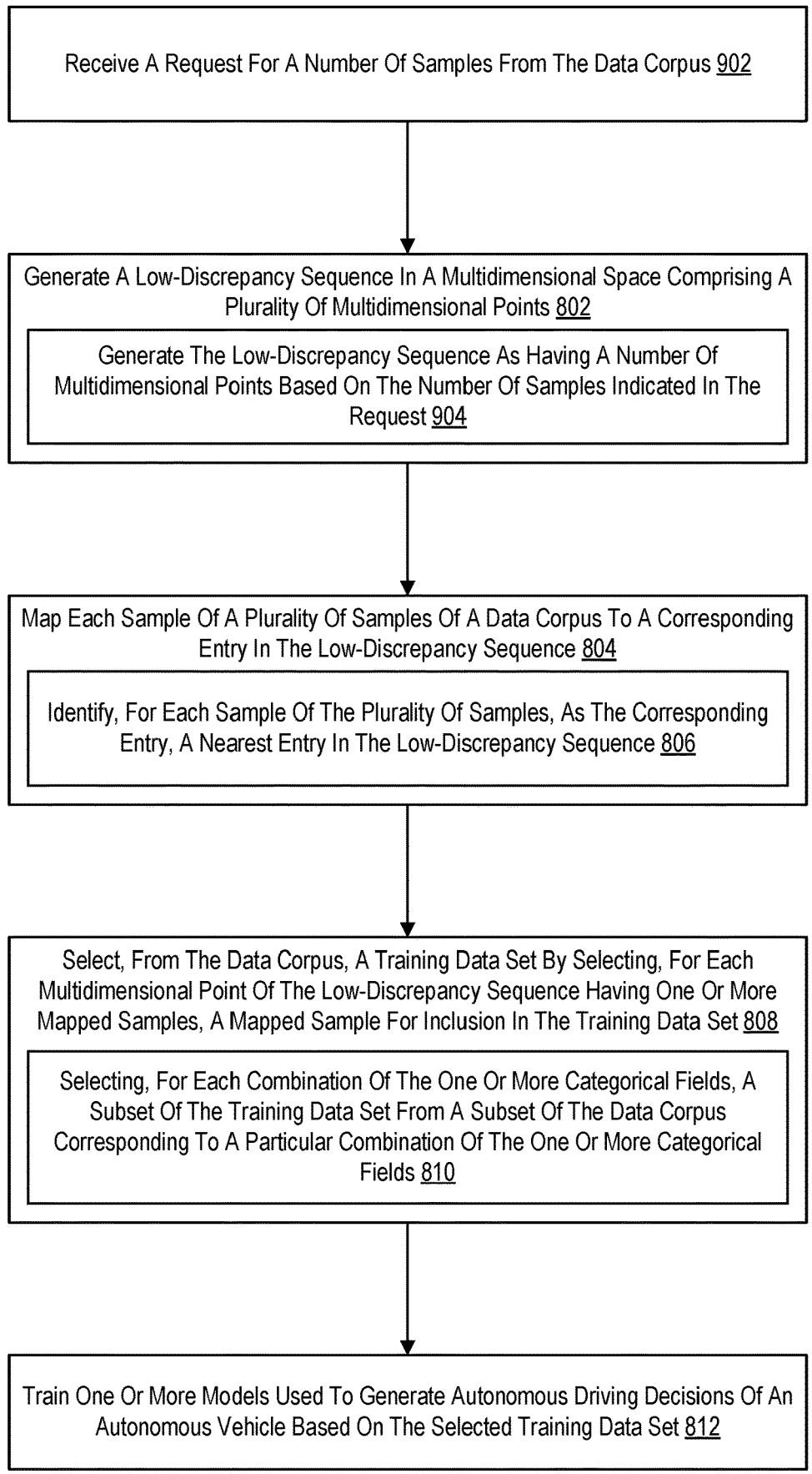
FIG. 9 is a flow chart of another example method for autonomous vehicle model training using low-discrepancy sequences according to some embodiments of the present disclosure.

For further explanation, FIG. 9 sets forth a flowchart of another example method of autonomous vehicle model training using low-discrepancy sequences according to some embodiments of the present disclosure. The method of FIG. 9 is similar to FIG. 8. The method of FIG. 9 differs from FIG. 8, however, in that the method of FIG. 9 also includes receiving 902 a request for a number of samples from the data corpus. In some embodiments, the request may indicate a particular schema for samples selected from the data corpus. For example, in some embodiments, the request may indicate particular fields of the data corpus to be included in or excluded from the selected training data. The method of FIG. 9 further differs from FIG. 8 in that generating 802 a low-discrepancy sequence in a multidimensional space comprising a plurality of multidimensional points includes generating 904 the low-discrepancy sequence as having a number of multidimensional points based on the number of samples indicated in the request.

In some embodiments, generating 904 the low-discrepancy sequence may include generating the low-discrepancy sequence as having a number of multidimensional points equal to the number of samples indicated in the request. In other words, where a request for N samples is received 902, a low-discrepancy sequence having N multidimensional points (e.g., entries) may be generated 904. For example, assume that a request for a training data set of N samples is received 902 and that the training data set is to be selected such that it will not include any categorical fields (e.g., either by virtue of the data corpus lacking categorical fields or the training data schema excluding any categorical fields of the data corpus). In such an embodiment, a low-discrepancy sequence of N multidimensional points is generated such that a single mapped data corpus sample for each multidimensional point may be added to the training data set, resulting in a training data set of N samples.

In some embodiments, generating 904 the low-discrepancy sequence may include generating the low-discrepancy sequence as having a number of multidimensional points based on the number of samples indicated in the request and a number of combinations of categorical field values (e.g., of the data corpus, of the selected training data set). In some embodiments, the low-discrepancy sequence may be generated 904 by dividing the number of samples indicated in the request by the number of combinations of categorical field values. In other words, assuming a request for N samples and M different combinations of categorical field values, the low-discrepancy sequence may be generated 904 to have N/M multidimensional points. A training data set may then be selected by selecting, for each combination of categorical field values, a mapped data corpus sample for each multi-dimension point, with the mapped data corpus samples being selected from a subspace for a particular categorical field value combination. In other words, M subsets of training data (one for each combination of categorical field values) having N/M samples are selected, resulting in a training data set of N samples.

Figure 10:
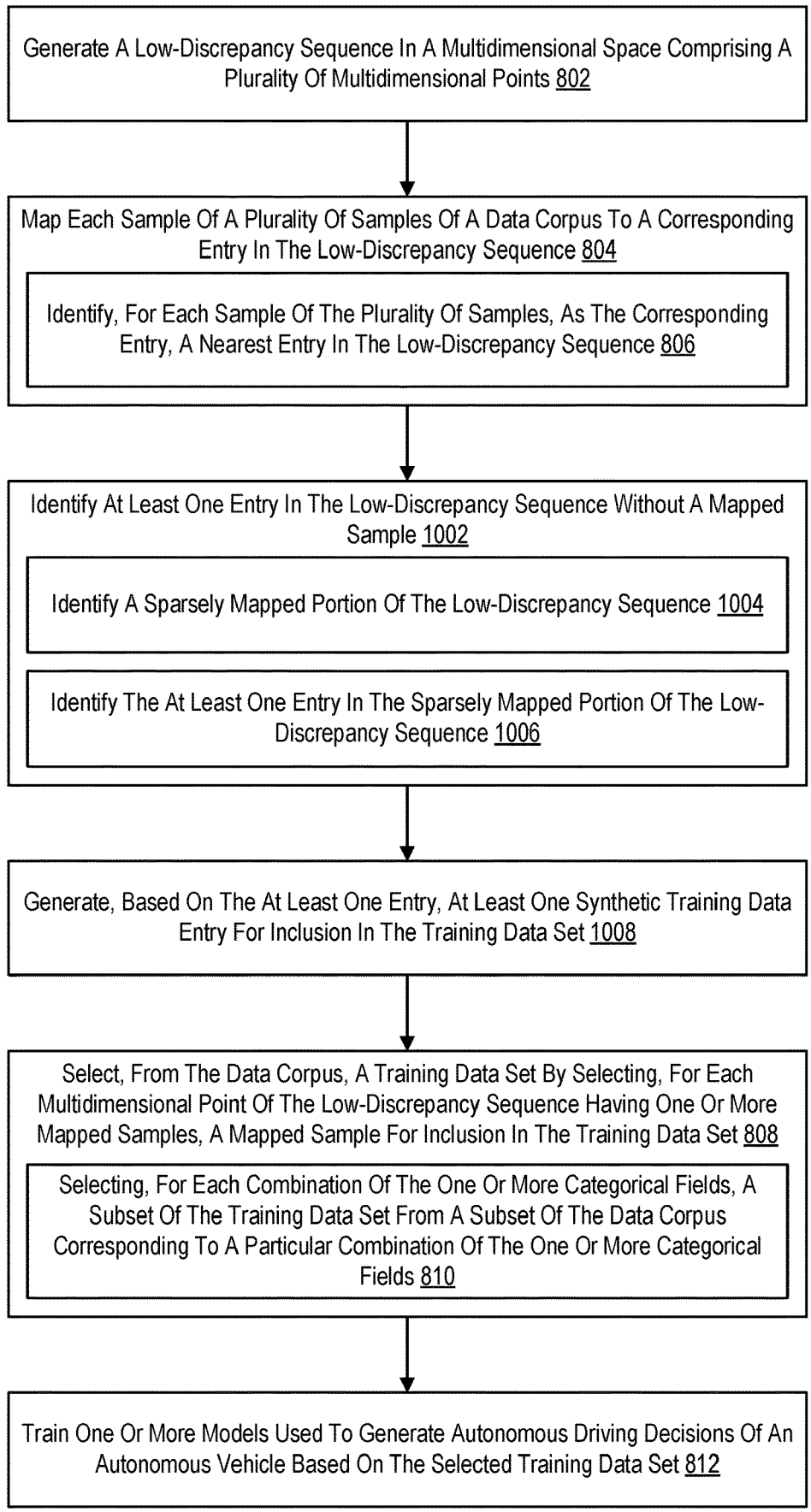
FIG. 10 is a flow chart of another example method for autonomous vehicle model training using low-discrepancy sequences according to some embodiments of the present disclosure.

For further explanation, FIG. 10 sets forth a flowchart of another example method of autonomous vehicle model training using low-discrepancy sequences according to some embodiments of the present disclosure. The method of FIG. 10 is similar to FIGS. 8 and 9. The method of FIG. 10 differs from FIGS. 8 and 9, however, in that the method of FIG. 10 also includes identifying 1002 at least one entry in the low-discrepancy sequence without a mapped sample. As is set forth above, depending on the shape of data in the data corpus, some entries in the low-discrepancy sequence may not have any mapped sample, or may not have a mapped sample for a particular subspace of a particular combination of categorical field values. In some embodiments, identifying 1002 the at least one entry may include identifying those entries without a mapped sample (e.g., at all or for a particular subspace). Such entries are hereinafter referred to as "unmapped entries." Although some entries may be mapped in particular subspaces, an entry may still be considered unmapped with respect to some other subspace. In some embodiments, identifying 1002 the at least one entry may include identifying a subset of multiple unmapped entries. The subset of unmapped entries may be identified according to a variety of approaches, such as a random selection of unmapped entries, a percentage or proportion of unmapped entries, a number of such entries such that the number unmapped entries falls below some threshold (e.g., thresholds applicable to all entries or thresholds with respect to individual subspaces), and the like.

In some embodiments, identifying 1002 the at least one entry may include identifying 1004 a sparsely mapped portion of the low-discrepancy sequence. A sparsely mapped portion of the low-discrepancy sequence is a set or region of neighboring unmapped entries having a density (e.g., a number of included neighboring unmapped entries) exceeding some threshold. In some embodiments, the threshold may include a predefined or user-defined threshold. In some embodiments, the threshold may be based on a particular type of model of the one or more models to be trained using the training data set. For example, the threshold may be higher models used in less critical systems or with less associated risk while the threshold may be higher for models used in more critical systems. In some embodiments, the threshold may be based on the shape of the data in the sparsely mapped portion. For example, the threshold may be based on a particular dimension or dimensions in which the sparsely mapped portion of the low-discrepancy sequence are neighbors. In other words, the threshold may be based on a particular dimension or dimensions including changing, neighboring values in the neighboring unmapped entries. For example, assume that a region of neighboring unmapped entries varies in value for a particular dimension, indicating a gap in mapping of entries for that particular dimension. The threshold for identifying this region as sparsely mapped may be based on the particular value (e.g., in the data corpus) corresponding to this dimension of the low-discrepancy sequence. For example, a higher threshold may be used for a dimension corresponding to time of day, as small variations in the time of day will not materially affect the quality of selected training data. As another example, a lower threshold may be used for a dimension corresponding to braking pressure, as small variations in braking pressure may have greater impact on the training data.

Identifying 1002 at least one entry in the low-discrepancy sequence without a mapped sample may therefore also include identifying 1006 the at least one entry in the sparsely mapped portion of the low-discrepancy sequence. The at least one entry may be identified according to various approaches, including randomly, based on a predefined or dynamically calculated number of entries to be identified, and the like. As a further example, the at least one entry may be identified 1006 such that, after mapping, the density of unmapped entries (e.g., in the sparsely mapped portion) falls below a threshold, such as a threshold as described above.

The method of FIG. 10 also includes generating 1008, based on the at least one entry, at least one synthetic training data entry for inclusion in the training data set. In contrast to training data selected from the data corpus, which describes a real event or moment in time (e.g., as captured by a sensor-equipped vehicle), a synthetic training data entry is programmatically generated to simulate some other data. In some embodiments, a synthetic training data entry for a particular subspace (e.g., a particular categorical field value combination) may be generated by setting one or more categorical fields to equal the particular categorical field value combination. In some embodiments, a synthetic training data entry can be generated based on a particular multidimensional point in the low-discrepancy sequence. As is set forth above, each dimension of the multidimensional points may correspond to a particular continuous field of the data corpus and/or the training data. Accordingly, in some embodiments, a synthetic training data entry can be generated by converting values of particular dimensions of the particular multidimensional point to values for their corresponding continuous fields included in training data.

In some embodiments, converting values of the multidimensional point to values for their corresponding continuous fields may include converting a value of the multidimensional point to a continuous value based on some range of for the corresponding continuous field. The range may include a predefined range constraining the continuous field, a range including a minimum and/or maximum value for the continuous field in the data corpus, and the like. In other words, converting values of the multidimensional point to values for their corresponding continuous fields may be performed by effectively reversing the scaling process described above with respect to scaling the data corpus to the multidimensional space. For example, assume that a particular multidimensional point includes a value of 0.75 corresponding to the continuous field for a lane offset. Referring to the example above, assume that lane offsets may range from −1.8 meters to 1.8 meters. Here, the value of the multidimensional point of 0.75 may be converted to a continuous value of 0.9 the lane offset continuous field.

In some embodiments, generating a synthetic training data entry may include generating other synthetic sensor data. Such other synthetic sensor data may include, for example, synthetic images or video, synthetic radar readings, synthetic LiDAR readings, and the like. The synthetic sensor data may be generated based on other fields of the corresponding synthetic training data set. In some embodiments, environmental descriptors and/or state descriptors may be provided as input for generating synthetic sensor data using one or more models, one or more simulators or rendering engines, and the like. For example, in some embodiments, environmental descriptors and/or state descriptors may be used as configuration parameters for a driving simulator or visual modeling or rendering engine to generate a simulated environment (e.g., relative to some ego vehicle). Images may then be captured or generated using the simulated environment to simulate a view of the environment from a particular camera of the ego vehicle. As another example, the environmental descriptors and/or state descriptors may be provided as input to one or more trained models configured to generate artificial images or other sensor data.

In some embodiments, the at least one synthetic training data entry may be generated 1008 by generating, for each of the identified 1002 unmapped entries, a corresponding synthetic training data entry. Thus, the unmapped entries are effectively mapped to the corresponding synthetic training data entry, thereby reducing the number of unmapped entries and reducing the density of neighboring unmapped entries. This improves the overall quality of a selected training data set as the model as it may be preferable to train a model on synthetic data for a particular scenario rather than no data.

Figure 11:
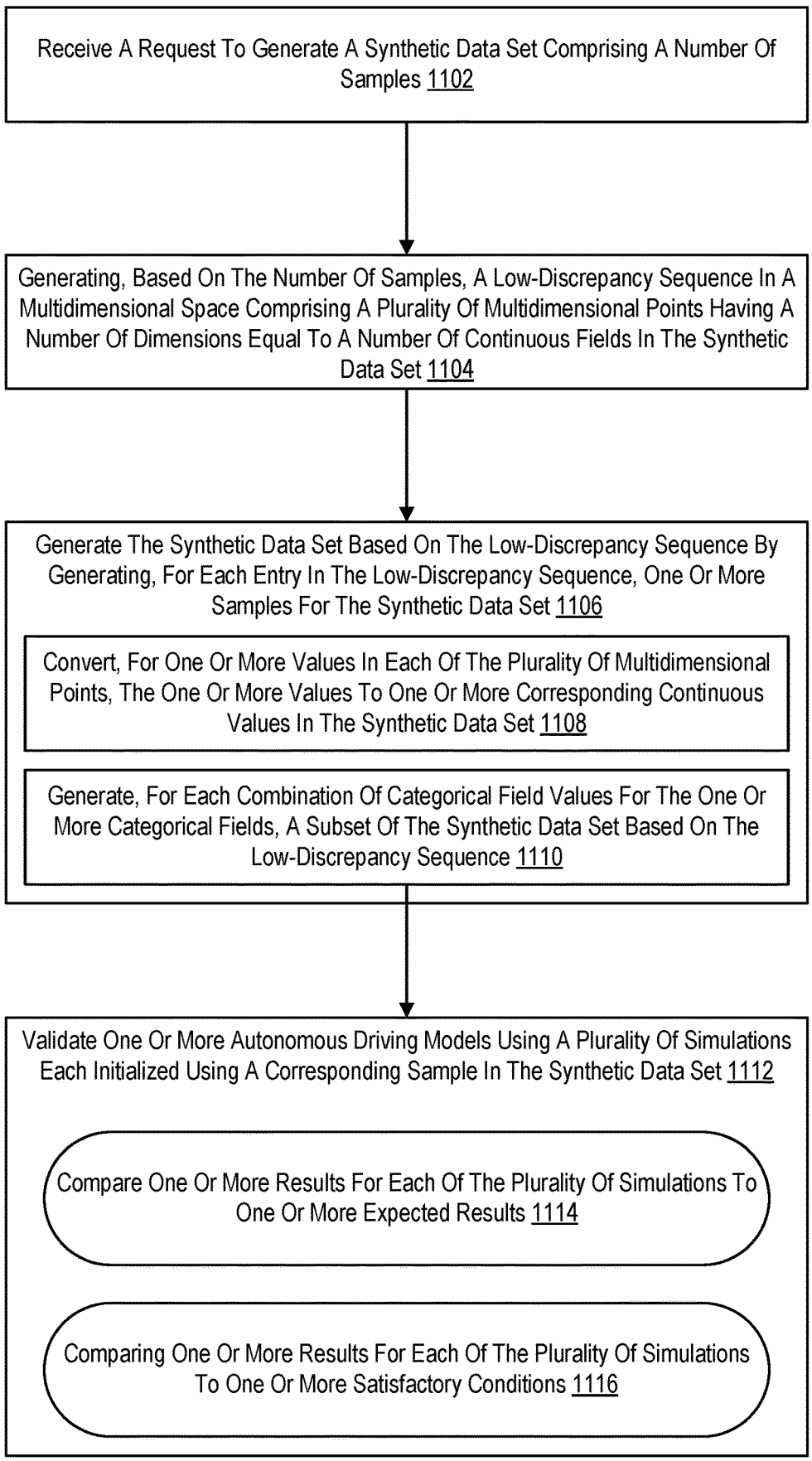
FIG. 11 is a flow chart of another example method for autonomous vehicle model training using low-discrepancy sequences according to some embodiments of the present disclosure.

For further explanation, FIG. 11 sets forth a flowchart for another method of autonomous vehicle model validation using low-discrepancy sequences according to some embodiments of the present disclosure. The method of FIG. 11 may be performed, for example, by an execution environment such as the execution environment of FIG. 7, or another system of computing devices or compute resources as can be appreciated. The method of FIG. 11 includes receiving 1102 a request to generate a synthetic data set comprising a number of samples. A synthetic data set is similar to a synthetic training data set as described above in that the synthetic data set is a programmatically generated data set. As an example, the synthetic data set may include a set of samples (e.g., simulated samples) replicating a portion of a data corpus as described above. For example, the synthetic data set may include environmental descriptors and/or state descriptors as described above with respect to a vehicle. In some embodiments, the request may indicate a particular schema for the synthetic data set. For example, some embodiments, the request may indicate particular fields to be included in or excluded from the synthetic data set. As another example, the request may include an identifier or selection of a particular predefined schema for a synthetic data set.

As will be addressed in further detail below, in some embodiments, the synthetic data set may be used to initialize a simulation, such as for a simulated driving environment. Accordingly, in some embodiments, the synthetic data set may include additional, fewer, or different fields than the data corpus described above. For example, the synthetic data set may include categorical fields indicating a number of vehicles proximate to an ego vehicle, categorical fields indicating the placement (e.g., relative placement, lane placement) of the other vehicles, and the like. The synthetic data set may also include continuous fields for behavioral characteristics of the ego vehicle, such as velocity, amounts of acceleration or braking applied, degrees of wheel and/or tire rotation, angle or heading, and the like. The synthetic data set may also include continuous fields defining road characteristics and/or interactions between the ego vehicle and the road, such as road slope or slant, degrees of friction between the road and the ego vehicle, a weight of the ego vehicle, and the like.

The method of FIG. 11 also includes generating 1104, based on the number of samples, a low-discrepancy sequence in a multidimensional space comprising a plurality of multidimensional points having a number of dimensions equal to a number of continuous fields in the synthetic data set. The low-discrepancy sequence includes a low-discrepancy sequence as is described above, such as a Sobol sequence. Here, the low-discrepancy sequence is in a multidimensional space having a number of dimensions equal to a number of continuous fields of the synthetic data set. Thus, each dimension of the low-discrepancy sequence corresponds to a particular continuous field of the synthetic data set. In some embodiments, the low-discrepancy sequence is based on the number of samples indicated in the request in that the low-discrepancy sequence includes a number of multidimensional points (e.g., entries) equal to the number of samples indicated in the request. Thus, each sample in the synthetic data set may correspond to a particular entry of the low-discrepancy sequence. In some embodiments, such as where the synthetic data set includes one or more categorical fields, the low-discrepancy sequence is based on the number of samples indicated in the request in that the low-discrepancy sequence includes a number of entries equal to the number of samples indicated in the request divided by a number of combinations of categorical field values. For example, a request for N samples of a synthetic data set having M categorical fields each having P possible values, the low-discrepancy sequence may be generated to have N/(M*P) entries.

The method of FIG. 11 also includes generating 1106 the synthetic data set based on the low-discrepancy sequence by generating, for each entry in the low-discrepancy sequence, one or more samples for the synthetic data set. A synthetic data set sample may be generated from an entry in the low-discrepancy sequence according to similar approaches as are set forth above with respect to generating a synthetic training data entry from an entry in the low-discrepancy sequence. For example, in some embodiments, generating 1106 the synthetic data set may include converting 1108, for one or more values in each of the plurality of multidimensional points, the one or more values to one or more corresponding continuous values in the synthetic data set. In other words, each value in a multidimensional point (e.g., for each dimension) is converted to a continuous value for its corresponding continuous field in the synthetic data set.

In some embodiments, the synthetic data set may include one or more categorical fields. Accordingly, in some embodiments, generating 1106 the synthetic data set may include generating 1110, for each combination of categorical field values for the one or more categorical fields, a subset of the synthetic data set based on the low-discrepancy sequence. Each combination of categorical field values may define a particular subspace of the synthetic data set. A subset of the synthetic data set may be generated by generating, for that particular subspace (e.g., for that particular combination of categorical field values), a synthetic data set entry for each multidimensional point of the low-discrepancy sequence. For example, assuming a low-discrepancy sequence of N entries and M combinations of categorical field values, a synthetic data set of N*M entries may be generated. Thus, each entry in the low-discrepancy sequence is used to generate, for each combination of categorical field values, a synthetic data set entry. A particular synthetic data set entry may therefore include continuous field values converted from their values in the corresponding entry of the low-discrepancy sequence, as well as categorical field values equal to the combination of categorical field values of their particular subset/subspace.

The method of FIG. 11 also includes validating 1112 one or more autonomous driving models using a plurality of simulations each initialized using a corresponding sample in the synthetic data set. Each synthetic data set entry may include values usable as configuration parameters for a simulated driving environment. In a simulated driving environment, a simulated ego vehicle may be driven using autonomous driving models. The values of a synthetic data set entry may be used to define, in the simulated driving environment, an environment relative to the ego vehicle (e.g., a number and placement of other vehicles on the road, particular characteristics of the road, lighting or weather conditions). The values of a synthetic data set entry may be used to define, in the simulated driving environment, various attributes and behavioral characteristics of a simulated ego vehicle, such as the weight, steering angle, starting velocity, starting acceleration or deceleration, heading), or location in the road (e.g., which lane and/or how centered in the lane). Using a particular simulation initialized using a particular synthetic data set entry, the simulation may be executed whereby the simulated ego vehicle controlled by one or more autonomous driving models operates in the simulated environment as initialized in order to validate the one or more autonomous driving models.

Validating 1112 the one or more autonomous driving models may be performed according to a variety of approaches, independently or in combination. In some embodiments, validating 1112 the one or more autonomous driving models may include comparing 1114 one or more results of each of the plurality of simulations to one or more expected results. A result of a given simulation may describe a state of the ego vehicle and/or the environment when the simulation has ended (e.g., due to meeting one or more conditions defining conclusion of the simulation). The result of a given simulation may also describe various metrics or other data points aggregated or measured during the simulation.

Comparing 1114 one or more results of each of the plurality of simulations to one or more expected results may therefore be used to determine whether the one or more autonomous driving models performed (e.g., caused the simulated ego vehicle) to perform as expected, such as by determining whether particular actions were performed, or whether other conditions expected to be satisfied were satisfied. For example, assume that, for a given simulation, an expected result is that the ego vehicle performs a lane change operation. Comparing 1114 the results may then include determining whether the ego vehicle performed the lane change operation as expected.

In some embodiments, validating 1112 the one or more autonomous driving models may include comparing 1116 one or more results of each of the plurality of simulations to one or more satisfactory conditions. The one or more satisfactory conditions are criteria that, if met, may validate or contribute to validation of the one or more autonomous driving models. For example, the one or more satisfactory conditions may include collision avoidance, acceleration or deceleration falling within particular thresholds, collision damage or force of impact falling below particular thresholds, adherence to particular laws or safety rules, and the like.

As is described above, the low-discrepancy sequence provides for an evenly distributed set of multidimensional points in the multidimensional space. Synthetic data sets generated using the low-discrepancy sequence are therefore evenly distributed in the multidimensional space. Moreover, the synthetic data set is evenly distributed across each subspace defined by the categorical field values. This allows for simulations to be performed across an evenly distributed set of initial states defined by the synthetic data set. Models may then be validated across an evenly distributed and evenly covered set of scenarios, providing for more thorough and complete validation for models.

In view of the explanations set forth above, the benefits of autonomous vehicle model training and validation using low-discrepancy sequences according to embodiments of the present disclosure include: evenly distributed training data for training autonomous driving models and evenly distributed validation of autonomous driving models, resulting in improved performance of an autonomous vehicle.

Exemplary embodiments of the present disclosure are described largely in the context of a fully functional computer system for autonomous vehicle model training and validation using low-discrepancy sequences. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   generating a low-discrepancy sequence in a multidimensional space comprising a plurality of multidimensional points;
   mapping each sample of a plurality of samples of a data corpus to a corresponding entry in the low-discrepancy sequence, wherein each sample of the plurality of samples is encoded as a record comprising a plurality of field-value pairs, wherein the plurality of field-value pairs comprises one or more environmental descriptors for an environment relative to a corresponding vehicle and one or more state descriptors describing a state of the corresponding vehicle, wherein each sample is generated by and received from the corresponding vehicle;
   selecting, from the data corpus, a training data set by selecting, for each multidimensional point of the low-discrepancy sequence having one or more mapped samples, a mapped sample for inclusion in the training data set; and
   training one or more models used to generate autonomous driving decisions of an autonomous vehicle based on the selected training data set.

2. The method of claim 1, wherein each sample of the plurality of samples comprises a plurality of continuous fields each corresponding to a dimension of the multidimensional space.

3. The method of claim 2, wherein each sample in the data corpus further comprises one or more categorical fields.

4. The method of claim 3, wherein selecting the training data set comprises selecting, for each combination of categorical field values of the one or more categorical fields, a subset of the training data set from a subset of the data corpus corresponding to a particular combination of categorical field values.

5. The method of claim 1, wherein mapping each sample of the plurality of samples the corresponding entry in the low-discrepancy sequence comprises identifying, for each sample of the plurality of samples, as the corresponding entry, a nearest entry in the low-discrepancy sequence.

6. The method of claim 1, further comprising receiving a request for a number of samples from the data corpus, wherein generating the low-discrepancy sequence comprises generating the low-discrepancy sequence as having a number of multidimensional points based on the number of samples indicated in the request.

7. The method of claim 1, further comprising:
identifying at least one entry in the low-discrepancy sequence without a mapped sample; and
generating, based on the at least one entry, at least one synthetic training data entry for inclusion in the training data set.

8. The method of claim 7, wherein identifying the at least one entry comprises:
identifying a sparsely mapped portion of the low-discrepancy sequence; and
identifying the at least one entry in the sparsely mapped portion of the low-discrepancy sequence.

9. The method of claim 8, wherein identifying the sparsely mapped portion of the low-discrepancy sequence is based on one or more density thresholds.

10. The method of claim 9, wherein the one or more density thresholds are based on one or more of: a particular type of model of the one or more models or a particular dimension in the multidimensional space.

11. The method of claim 1, wherein the low-discrepancy sequence comprises a Sobol sequence.

12. An apparatus comprising at least one processor and memory storing instructions that, when executed, cause the at least one processor to perform steps comprising:
generating a low-discrepancy sequence in a multidimensional space comprising a plurality of multidimensional points;
mapping each sample of a plurality of samples of a data corpus to a corresponding entry in the low-discrepancy sequence, wherein each sample of the plurality of samples is encoded as a record comprising a plurality of field-value pairs, wherein the plurality of field-value pairs comprises one or more environmental descriptors for an environment relative to a corresponding vehicle and one or more state descriptors describing a state of the corresponding vehicle, wherein each sample is generated by and received from the corresponding vehicle;
selecting, from the data corpus, a training data set by selecting, for each multidimensional point of the low-discrepancy sequence having one or more mapped samples, a mapped sample for inclusion in the training data set; and
training one or more models used to generate autonomous driving decisions of an autonomous vehicle based on the selected training data set.

13. The apparatus of claim 12, wherein each sample of the plurality of samples comprises a plurality of continuous fields each corresponding to a dimension of the multidimensional space.

14. The apparatus of claim 13, wherein each sample in the data corpus further comprises one or more categorical fields.

15. The apparatus of claim 14, wherein selecting the training data set comprises selecting, for each combination of categorical field values of the one or more categorical fields, a subset of the training data set from a subset of the data corpus corresponding to a particular combination of categorical field values.

16. The apparatus of claim 12, wherein mapping each sample of the plurality of samples the corresponding entry in the low-discrepancy sequence comprises identifying, for each sample of the plurality of samples, as the corresponding entry, a nearest entry in the low-discrepancy sequence.

17. The apparatus of claim 12, wherein the steps further comprise receiving a request for a number of samples from the data corpus, wherein generating the low-discrepancy sequence comprises generating the low-discrepancy sequence as having a number of multidimensional points based on the number of samples indicated in the request.

18. The apparatus of claim 12, wherein the steps further comprise:
identifying at least one entry in the low-discrepancy sequence without a mapped sample; and
generating, based on the at least one entry, at least one synthetic training data entry for inclusion in the training data set.

19. The apparatus of claim 18, wherein identifying the at least one entry comprises:
identifying a sparsely mapped portion of the low-discrepancy sequence; and
identifying the at least one entry in the sparsely mapped portion of the low-discrepancy sequence.

20. The apparatus of claim 19, wherein identifying the sparsely mapped portion of the low-discrepancy sequence is based on one or more density thresholds.

21. The apparatus of claim 20, wherein the one or more density thresholds are based on one or more of: a particular type of model of the one or more models or a particular dimension in the multidimensional space.

22. The apparatus of claim 12, wherein the low-discrepancy sequence comprises a Sobol sequence.

* * * * *